United States Patent
Suga

(10) Patent No.: US 9,414,344 B2
(45) Date of Patent: Aug. 9, 2016

(54) COMMUNICATION SYSTEM, COMMUNICATION APPARATUS, AND COMPUTER-READABLE MEDIUM INCLUDING COMMUNICATION PROGRAM AND COMMUNICATION METHOD

(71) Applicant: FUJITSU LIMITED, Kawasaki-shi, Kanagawa (JP)

(72) Inventor: Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/246,924

(22) Filed: Apr. 7, 2014

(65) Prior Publication Data
US 2014/0313996 A1 Oct. 23, 2014

(30) Foreign Application Priority Data

Apr. 22, 2013 (JP) .................. 2013-089828

(51) Int. Cl.
*H04W 56/00* (2009.01)
*H04L 12/709* (2013.01)
*H04L 29/06* (2006.01)
*H04L 12/891* (2013.01)
(Continued)

(52) U.S. Cl.
CPC ......... *H04W 56/0045* (2013.01); *H04L 45/245* (2013.01); *H04L 47/41* (2013.01); *H04L 69/14* (2013.01); *H04L 47/14* (2013.01); *H04L 47/193* (2013.01); *H04L 47/32* (2013.01); *H04L 69/168* (2013.01); *Y02B 60/33* (2013.01)

(58) Field of Classification Search
None
See application file for complete search history.

(56) References Cited

U.S. PATENT DOCUMENTS

2005/0259577 A1* 11/2005 Sin .................. H04L 1/188
370/229
2007/0018708 A1* 1/2007 Yoo .................. H04L 47/10
327/261
(Continued)

FOREIGN PATENT DOCUMENTS

EP 1 841 140 A1 10/2007
JP 2011-135145 A 7/2011
(Continued)

OTHER PUBLICATIONS

Extended European Search Report dated Jul. 29, 2014 issued in Patent Application No. 14164112.6.
(Continued)

Primary Examiner — Habte Mered
(74) Attorney, Agent, or Firm — Arent Fox LLP

(57) ABSTRACT

A system includes a first apparatus including a memory and a processor coupled to the memory, wherein the first apparatus is configured to transmit packets; and a second apparatus configured to receive the packets, wherein the processor is configured to, switch communication settings for transmitting the packets during the packets are transmitted to the second apparatus; determine whether an acknowledge is caused due to a switching of the communication settings, the acknowledge indicating that the second apparatus expects that a first packet among the packets is retransmitted, the first packet was transmitted based on a first communication setting among the communication settings; and adjust a transmission timing of a second packet that is transmitted based on a second communication setting among the communication settings, upon determining that the acknowledge is caused due to the switching of the communication settings.

19 Claims, 16 Drawing Sheets

(51) Int. Cl.
  *H04L 12/801* (2013.01)
  *H04L 12/823* (2013.01)

(56) References Cited

U.S. PATENT DOCUMENTS

2007/0230337 A1* 10/2007 Igarashi ................ H04L 1/1848
                                                        370/230
2007/0253337 A1* 11/2007 Morinaga ........... H04L 12/6418
                                                        370/249
2008/0159192 A1*  7/2008 Lee ...................... H04L 1/1867
                                                        370/310
2009/0190608 A1*  7/2009 Kawamoto ................ H04L 1/04
                                                        370/464
2013/0055349 A1*  2/2013 Kim .................... H04L 63/1458
                                                          726/3
2014/0050086 A1*  2/2014 Himayat ............ H04N 21/2365
                                                        370/230

FOREIGN PATENT DOCUMENTS

WO    WO 2006/070471 A1    7/2006
WO    WO 2013/049960 A1    4/2013

OTHER PUBLICATIONS

Parsa et al., "Improving TCP Congestion Control over Internets with Heterogeneous Transmission Media," Computer Engineering Department, Baskin School of Engineering, University of California, Oct. 31, 1999, pp. 213-221.

* cited by examiner

FIG. 7

| SEQUENCE NUMBER | COMMUNICATION SETTING (EX. WIRELESS LINK) |
|---|---|
| 1 | B |
| 2 | A |
| 3 | B |
| 4 | B |
| 5 | B |
| 6 | A |
| 7 | B |
| 8 | B |
| 9 | A |
| ⋮ | ⋮ |

FIG. 8

| RECEPTION TIME | ACK SEQUENCE NUMBER | NUMBER OF DUPLICATE ACKS |
|---|---|---|
| 51:48.93845 | 2 | 2 |
| 51:49.00122 | 5 | 0 |

COMMUNICATION SYSTEM, COMMUNICATION APPARATUS, AND COMPUTER-READABLE MEDIUM INCLUDING COMMUNICATION PROGRAM AND COMMUNICATION METHOD

CROSS-REFERENCE TO RELATED APPLICATION

This application is based upon and claims the benefit of priority of the prior Japanese Patent Application No. 2013-089828, filed on Apr. 22, 2013, the entire contents of which are incorporated herein by reference.

FIELD

The embodiment discussed herein is related to a system, an apparatus, a computer-readable medium and a method.

BACKGROUND

Link aggregation technology is known as a technology for improving the throughput of communication. The link aggregation technology is a technology in which a plurality of communication links that are usable for communication are prepared between the transmission apparatus and the reception apparatus, and a communication link for transmitting data from the transmission apparatus is switched among the plurality of communication links in accordance with the usage state of each communication link, thereby improving the throughput of communication. Then, data transmitted from the transmission apparatus is transmitted in accordance with a protocol such as Transmission Control Protocol (TCP) or User Datagram Protocol (UDP).

When the link aggregation technology is used, packets are, in some cases, delivered to the reception apparatus in a different order than that in which they were transmitted from the transmission apparatus, because of a difference in communication performance, such as communication speed or communication delay, among communication links. Then, when the link aggregation technology is applied to TCP, this disorder of packets may lead to TCP retransmission control and so forth.

Note that there is a known technique in which the delay difference among wireless communication schemes in a wireless system section is measured for each wireless communication scheme by using probe packets such as ping packets, and all the packets transmitted by a wireless communication scheme with a small delay time are delayed by a time period corresponding to the delay difference of this wireless communication scheme, so that the disorder of packets is avoided. Also, a technique in which the distribution of delay times of a plurality of packets transmitted over an IP network is recorded, and packet transmission times are calculated is known.

Japanese Laid-open Patent Publication No. 2011-135145 and International Publication Pamphlet No. WO 2006-070471 disclose examples of the related art.

SUMMARY

According to an aspect of the embodiment, a system includes a first apparatus including a memory and a processor coupled to the memory, wherein the first apparatus is configured to transmit packets; and a second apparatus configured to receive the packets, wherein the processor is configured to, switch communication settings for transmitting the packets during the packets are transmitted to the second apparatus; determine whether an acknowledge is caused due to a switching of the communication settings, the acknowledge indicating that the second apparatus expects that a first packet among the packets is retransmitted, the first packet was transmitted based on a first communication setting among the communication settings; and adjust a transmission timing of a second packet that is transmitted based on a second communication setting among the communication settings, upon determining that the acknowledge is caused due to the switching of the communication settings.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of information stored in the communication apparatus of the embodiment;

FIG. 8 illustrates another example of information stored in the communication apparatus of the embodiment;

DESCRIPTION OF EMBODIMENT

First, study conducted by the inventor will be described. When packets are transmitted under a condition that a communication scheme being used is switched, a difference between the communication schemes may lead to a difference in the time period taken until delivery of packets to the reception apparatus between before and after the communication scheme switching. In order to inhibit packets from being reordered because of the difference in the time period, a timing at which a packet is to be transmitted (hereinafter referred to as "transmission timing") is set in some cases.

However, if actual measurement of a difference in the time period is performed in order to suitably set transmission timing, communication might not be performed until the actual measurement is completed.

According to an embodiment described below, in the case where packets are transmitted under a condition that a communication scheme being used is switched, a time period taken for setting so that packets arrive at the reception apparatus in the same order as they were transmitted is reduced.

Figure 1:
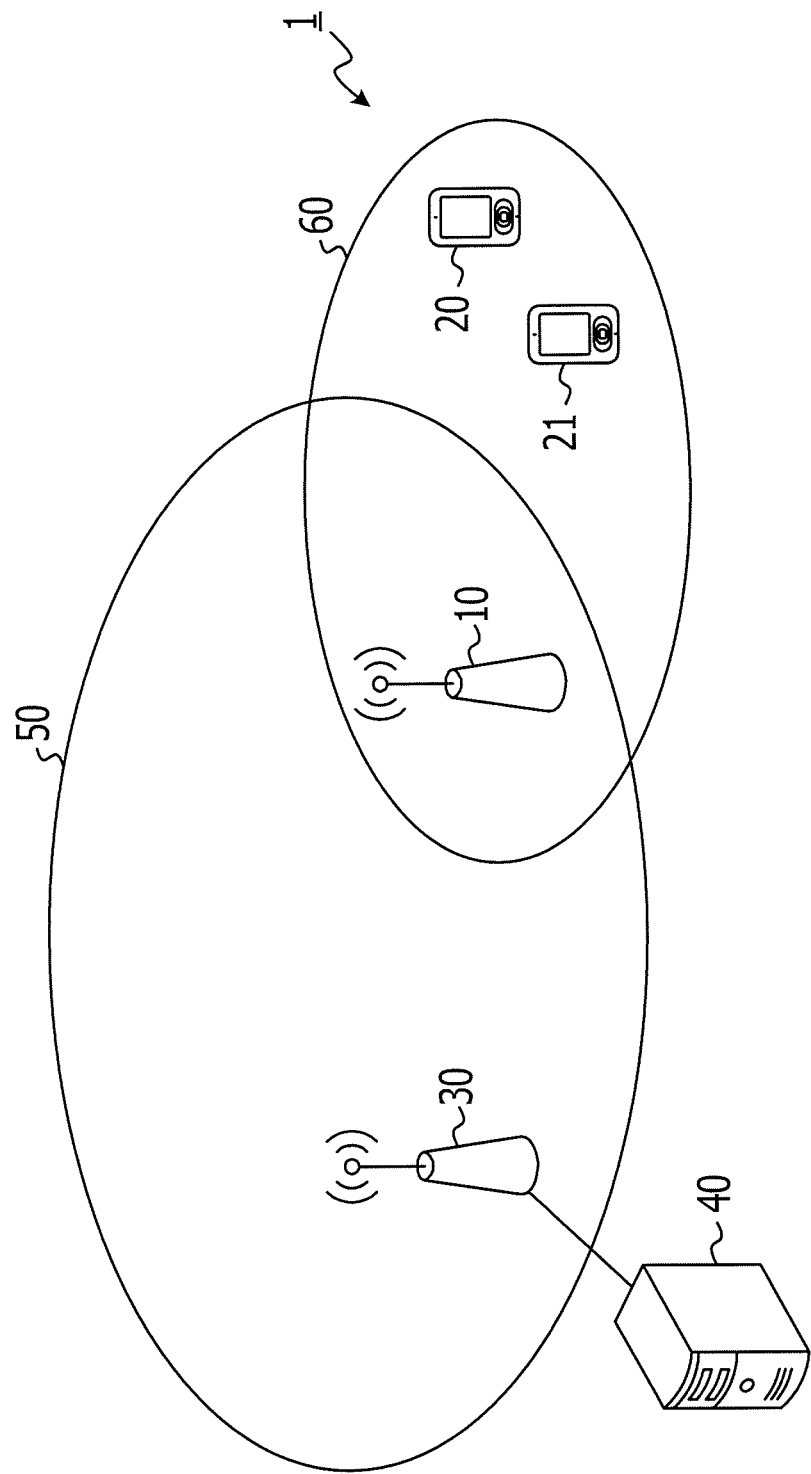
FIG. 1 illustrates an example of a communication system of an embodiment.

FIG. 1 illustrates an example of a communication system of the embodiment. A communication system 1 includes a base station 10 and terminals 20 and 21. The base station 10 included in a network 50 covered by a macro base station 30 receives a packet transmitted from a server 40, which is an application server, through the base station 30 and transmits that packet to the terminals 20 and 21. Note that although the terminals 20 and 21 are illustrated as client devices in FIG. 1, the embodiment is not limited to this. While switching the wireless link for transmitting packets among a plurality of wireless links in accordance with the usage state of radio resources in a network 60 covered by the base station 10, the base station 10 transmits packets to a plurality of client devices, such as the terminals 20 and 21, which exist in the network 60. Also, although the embodiment is described below, for example, for the case where the base station 10 and the terminals 20 and 21 perform communication using a plurality of wireless links, the embodiment is not limited to wireless communication and wired communication, but is applicable, in general, to communication links for realizing link aggregation between the host device and the client device.

Figure 2:
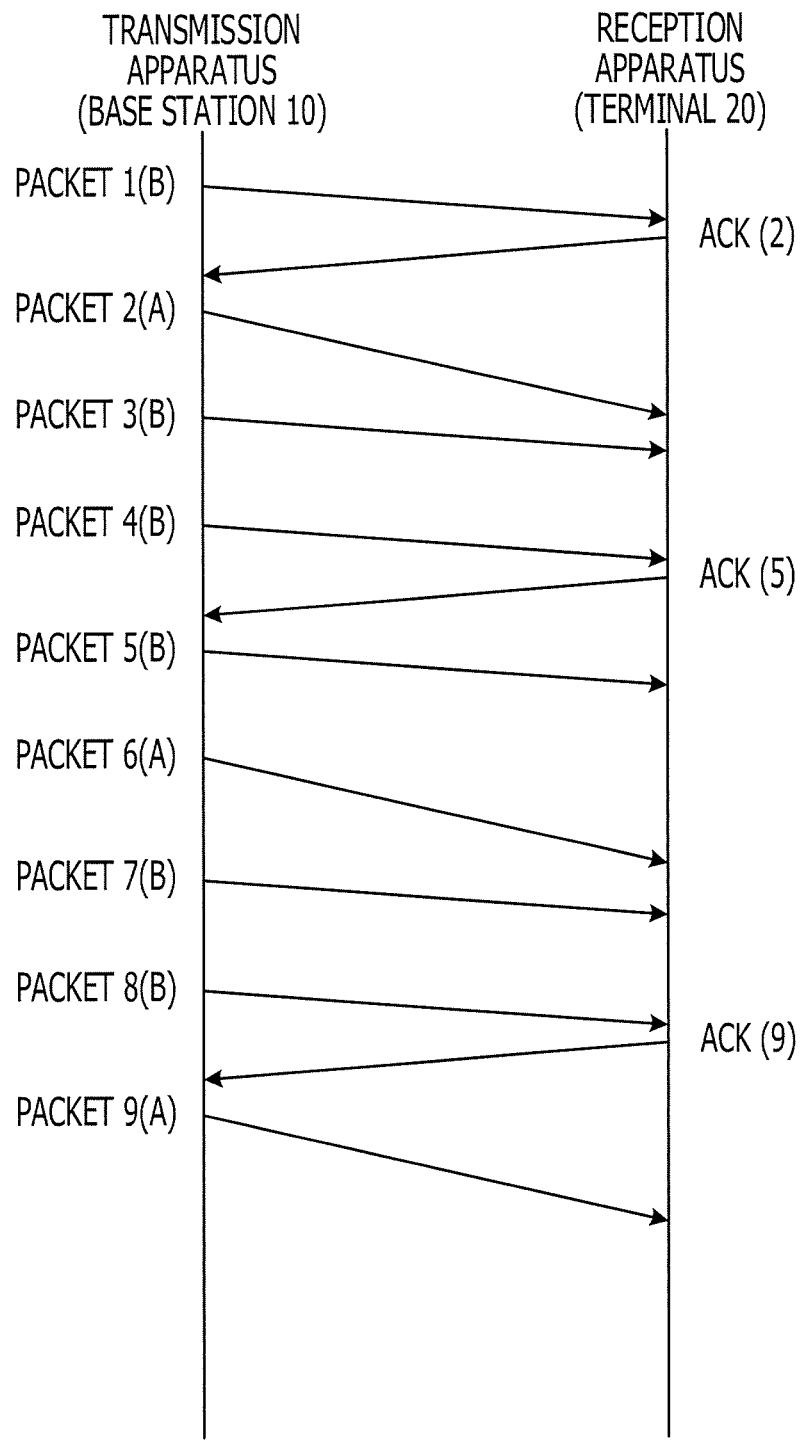
FIG. 2 illustrates an example of communication in the communication system of the embodiment.

FIG. 2 illustrates an example of communication in the communication system of the embodiment. In FIG. 2, an example in which the server 40 and the terminal 20 perform communication according to the Transmission Control Protocol (TCP), which is an exemplary protocol of the transport layer, via the base station 10 and in which the base station switches the wireless link for transmitting packets of the TCP between a wireless link A and a wireless link B in accordance with the availability of radio resources is shown. Here, the wireless link A is assumed, for example, to be a wireless link for performing data communication according to a communication scheme of mobile communication, and the wireless link B is assumed, for example, to be a wireless link for performing data communication in a wireless manner according to a wireless local area network (LAN) scheme. The communication speeds and the communication delays of wireless links usually differ depending on a difference between communication schemes. The example illustrated in FIG. 2, however, is an example in which the order of packets received by the terminal 20 is not reversed even if there are such differences in the communication speeds and so on. Note that the example in which the transmission apparatus is the base station 10 and the reception apparatus is the terminal 20 is presented, but the embodiment is not limited to this. The transmission apparatus may be the terminal 20, and the reception apparatus may be the base station 10.

In communication conforming to the TCP between the server 40, which is the host device, and the terminal 20, when the terminal 20, which is the reception apparatus, receives a packet, the terminal 20 determines what packets have not been received, based on a sequence number for indicating the sequential position of the packet that has been given to that packet by the server 40. Then, in order to make a request for transmission of packets that the terminal 20 has not yet received, the terminal 20 indicates the sequence number of a packet that is positioned at the beginning of the sequence of packets that have not arrived, in an ACK, and transmits this to the base station 10 as the transmission apparatus. Upon receipt of the ACK, the base station 10 recognizes that a packet with the sequence number indicated in the ACK is requested, and the packet is transmitted with this sequence number to the terminal 20 if this packet has not been transmitted. The recognitions and determinations of the base station 10 described above and below may be executed by the server 40.

Otherwise, if this packet has been transmitted from the base station 10, then the base station 10 determines that this packet has not arrived at the terminal 20 and retransmits it when the base station 10 receives a specific number of ACKs with the same sequence number. Note that the wording "this packet has been transmitted" refers to "this packet has at least been transmitted from the base station 10 toward the terminal 20". A supplementary explanation is given here. For example, if, although the packet has been transmitted from the server 40, a packet loss occurs in a communication path to the base station 10, the base station 10 is not able to immediately transmit the packet.

The terminal 20 does not transmit an ACK each time the terminal 20 receives a packet. Instead, the terminal 20 stands by for ACK transmission for a specific time period, so that one ACK is transmitted for a plurality of received packets. For this reason, when packets arrive in the order in which they were transmitted from the base station 10, the number of ACKs to be transmitted to the base station 10 is reduced. This may improve the efficiency of usage of communication bands as compared to the case where an ACK is generated for every packet. Note that even if the base station 10 does not receive an ACK for every packet, the base station 10 may determine that packets with sequence numbers preceding the sequence number indicated in a received ACK have at least been received by the terminal 20.

Additionally, when the terminal 20 transmits an ACK to the base station 10, the terminal 20 notifies the base station 10 of the amount of data that may be successively received, in accordance with the available capacity of a reception buffer of the terminal 20, and so on, by using the ACK, in addition to the sequence number of a packet positioned at the beginning in the order of packets that have not arrived. The amount of data that may be successively received is referred to as a "window size", and the base station 10 successively transmits packets the number of which is within the range of the window size, at specific transmission intervals, to the terminal 20.

For example, as illustrated in FIG. 2, a packet 1(B) is transmitted from the base station 10 to the terminal 20 using the wireless link B. Here, it is assumed that the figure that follows "packet" presents a sequence number and the letter of the alphabet in parentheses is information for identifying a wireless link that is used when the packet is transmitted. That is, in the example illustrated in FIG. 2, it is indicated that the packet 1 is the first packet in the case where a plurality of packets are transmitted and is transmitted over the wireless link B. Note that the wireless link is an exemplary communication setting described later.

Upon receipt of the packet 1(B), the terminal 20 presents 2, which is next to 1, as the sequence number of a packet positioned at the beginning of the order of packets that have not arrived at the terminal 20, in an ACK (illustrated as "ACK (2)" in FIG. 2), and transmits this ACK 2 to the base station 10, thereby requesting the base station 10 to transmit a packet 2. Additionally, the terminal 20 notifies the base station 10 of the window size, which is the size of data that may be successively received, by using the ACK 2. Note that although the embodiment is not limited to this example, the ACK is transmitted to the base station 10 using the same wireless link (for example, the wireless link B), regardless of a wireless link applied to a received packet, so that the order of ACKs transmitted from the terminal 20 to the base station 10 is not reversed. This is because, whereas a packet transmitted from the base station 10 to the terminal 20 may include application data from the server 40, the data size of an ACK is small and therefore the permitted limit of assignment of a wireless link to ACKs is large.

Upon receipt of the ACK 2, the base station 10 at least verifies, through the ACK 2, that the packet 1(B) has been delivered to the terminal 20, and transmits, to the terminal 20, a packet 2(A) requested to be transmitted and a packet 3(B) and a packet 4(B) that may be transmitted within the window size. Here, in the example illustrated in FIG. 2, by following rules for wireless-link switching in the base station 10, the packet 2(A) is transmitted over the wireless link A different from the wireless link of the packet 1(B), and, after the transmission of the packet 2(A), the wireless link for transmitting packets is switched and the packet 3(B) and the packet 4(B) are transmitted over the wireless link B.

Note that the switching between wireless links is carried out, for example, in accordance with the availability of radio resources. For example, in the case where the wireless link B is shared and used by a plurality of terminals, when the amount of wireless link B radio resources becomes smaller than a specific amount, some of the packets to be transmitted to some terminal are transmitted by using the wireless link A if some wireless link A radio resources are available. This is because good data communication is achieved by bringing the data amount of packets transmitted from the base station 10 per unit time close to the data amount of packets received by a terminal, rather than by delaying a transmission of a packet until the wireless link B radio resources become available. Switching from the wireless link A to the wireless link B is also carried out by similar reason. Whereas a transmission of an ACK is performed in accordance with the TCP, which is the protocol of the transport layer, switching of a wireless link, which is an exemplary communication setting, is carried out, for example, at the wireless layer, which is a communication layer lower than the transport layer.

Upon receipt of the packet 2(A), the packet 3(B), and the packet 4(B), the terminal 20 updates the window size in accordance with the available capacity of a reception buffer, and transmits, together with the updated window size, an ACK 5 identifying a fifth sequence number to the base station 10. Note that information identifying the communication scheme of a wireless link, which is a communication setting used for packet transmission, is included in a header portion of a packet transmitted from the base station 10, although the embodiment is not limited to this. Therefore, by following this information, the terminal 20 is able to process a received packet and to transmit an ACK to the base station 10 in such a manner as to be suitable for the communication scheme.

Upon receipt of the ACK 5, the base station 10 transmits a packet 5(B), a packet 6(A), a packet 7(B), and a packet 8(B) to the terminal 20 in accordance with the updated window size.

Figure 3:
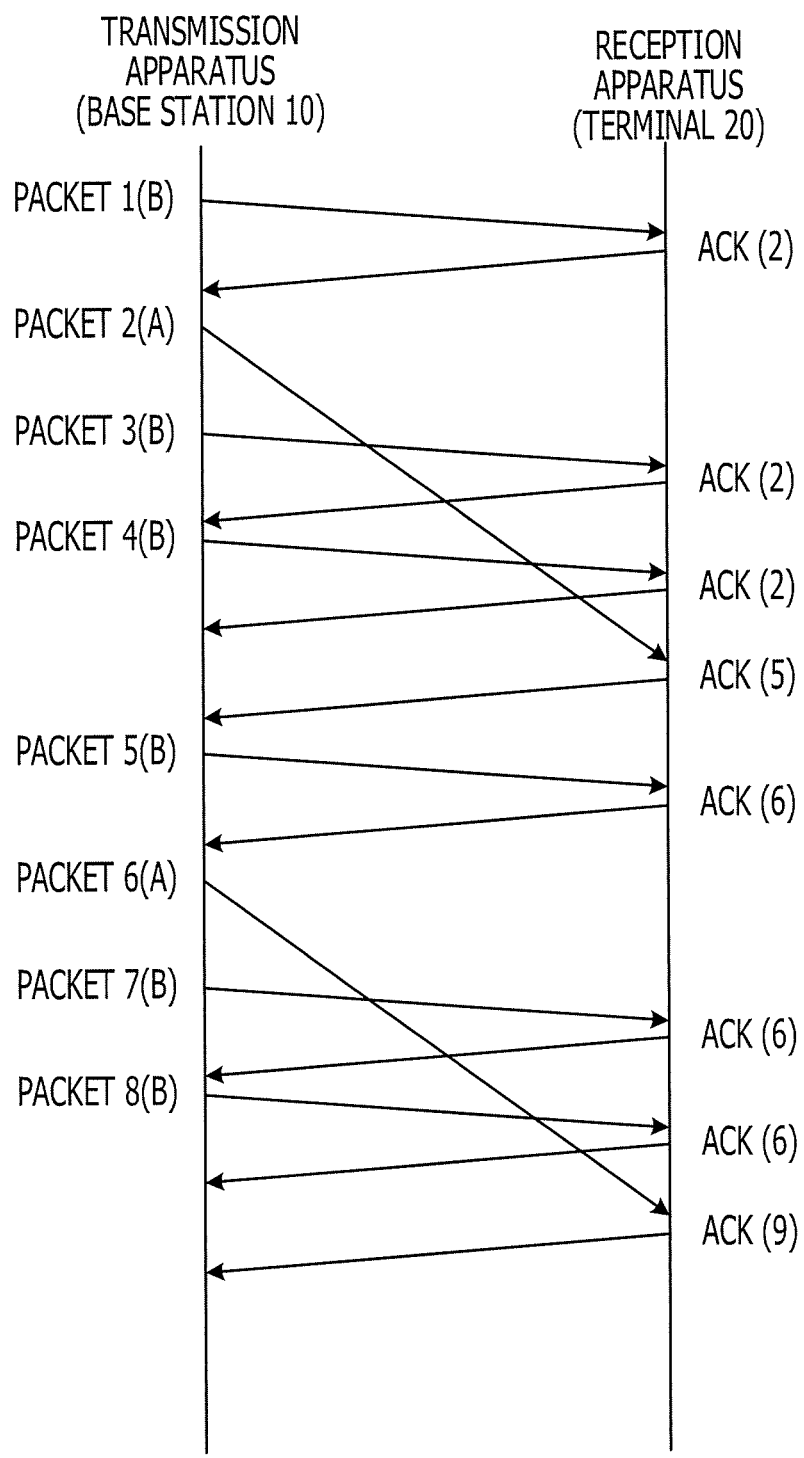
FIG. 3 illustrates a comparative example of communication.

FIG. 3 illustrates a comparative example of communication. In FIG. 3, a comparative example in the case where the base station 10 and the terminal 20 perform communication according to the TCP, which is an exemplary protocol of the transport layer, is illustrated. The example illustrated in FIG. 3, which is different from the example illustrated in FIG. 2, is an example in which when a packet is transmitted from the base station 10 to the terminal 20, the wireless link for transmitting packets is switched, and, as a result, the order of packets received by the terminal 20 is reversed because of a difference in communication speed between the wireless link A with a slow communication speed and the wireless link B with a fast communication speed.

Note that the disorder of packets as illustrated in FIG. 3 may occur when the communication delay of the wireless link A is larger than the communication delay of the wireless link B even if there is no difference in the communication speed between the wireless links. Also, even when the wireless links are of the same scheme, there are some cases in which changing the modulation scheme or the coding rate applied to packets leads to a change in the transmission rate of the packets in a manner similar to the case where switching between wireless links is carried out, resulting in the disorder of packets. The order of packets may be reversed owing to various reasons such as switching communication settings and the communication delay difference. Here, the case where the order of packets is reversed because of switching between wireless links is described by way of example. Also, the case will be described assuming that the terminal 20 does not arrange the order of packets that has been reversed at the communication layer lower than the transport layer, in order to reduce processing load to a minimum, although the embodiment is not limited to this.

As illustrated in FIG. 3, the packet 1(B) is transmitted from the base station 10 to the terminal 20 using the wireless link B. Upon receipt of the packet 1(B), the terminal 20 presents 2, which is next to 1, as the sequence number of a packet positioned at the beginning of the order of packets that have not arrived at the terminal 20, in an ACK (illustrated as "ACK (2)" in FIG. 3), and transmits this ACK 2 to the base station 10, thereby requesting the base station 10 to transmit the packet 2. Additionally, the terminal 20 notifies the base station 10 of the window size, which is the size of data that may be successively received, by using the ACK 2.

Upon receipt of the ACK 2, the base station 10 at least verifies, through the ACK 2, that the packet 1(B) has been delivered to the terminal 20, and transmits the requested packet 2(A), and the packet 3(B) and the packet 4(B) that may be transmitted within the window size, to the terminal 20. Here, in the example illustrated in FIG. 2, by following rules for wireless link switching in the base station 10, the packet 2(A) is transmitted over the wireless link A different from a wireless link used for the packet 1(B), and switching between wireless links is carried out after the transmission of the packet 2(A) and then the packet 3(B) and the packet 4(B) are transmitted over the wireless link B.

Here, in the example illustrated in FIG. 3, the communication speed of the wireless link A is slower than the communication speed of the wireless link B, and there is a difference in communication speed between the wireless link A and the wireless link B. For this reason, the terminal 20 receives the packet 3(B) and the packet 4(B) before receiving the packet 2(A). Upon receipt of the packet 3(B), since the terminal 20 has received the packet 3(B) next to the packet 1(B) and has not yet received the packet 2, the terminal 20 transmits the ACK 2 to the base station 10 again in accordance with the protocol of TCP in order to request the base station 10 to transmit the packet 2. Upon receipt of the packet 4(B), since the terminal 20 has not yet received the packet 2, the terminal 20 transmits the ACK 2 to the base station 10 once more in accordance with the protocol of TCP in order to request the base station 10 to transmit the packet 2.

That is, if packets are received in correct order based on the sequence numbers of packets, the terminal 20 does not transmit an ACK each time the terminal 20 receives a packet, and waits a specific time period before transmitting an ACK, whereas if packets are not received in correct order, the terminal 20 transmits an ACK indicating the sequence number of a packet that has not yet been received, to the base station 10 in accordance with the protocol of TCP in response to receipt of a packet that has already been received.

In this way, in the example illustrated in FIG. 3, the base station 10 receives, in addition to the ACK 2 received before the transmission of the packet 2(A), the ACK 2 indicating the same sequence number as before twice. The ACK used when a duplicate request for a packet having the same sequence number is made as mentioned above is referred to as a "duplicate ACK", and the base station 10 determines that the currently received ACK is a duplicate ACK, if the currently received ACK has the same sequence number as an ACK that has previously been received. Note that although an ACK having the same sequence number as the previously received ACK is a duplicate ACK, and an ACK and a duplicate ACK are substantially the same, the ACK and the duplicate ACK are distinguished from each other for the sake of explanation.

As described above, in communication conforming to the protocol of TCP, if packets are not received in the order of sequence numbers, each time the terminal 20, which is the reception apparatus, receives a packet that has arrived earlier, the terminal 20 transmits, to the base station 10, an ACK for making a request for a transmission of a packet that has an earlier sequence number than that of the received packet and that has not yet been received. For example, even in the case where a packet loss has not occurred in the case of the packet 2(B), and arrival of the packet 2(B) at the terminal 20 has been delayed because of the communication speed difference between wireless links, and therefore the packet 2(B) will be delivered to the terminal 20 if the terminal 20 waits, it is impossible for the terminal 20 to make a distinction between a packet loss and reversal of the order of packets at this point in time, and thus the transmission of a duplicate ACK as described above will be performed. As the transmission of the duplicate ACK from the terminal 20 caused by the disorder of packets increases, the amount of radio resources used for communication from the terminal 20 to the base station 10 increases.

In communication conforming to the protocol of TCP, if more than a specific number of duplicate ACKs indicating the same sequence number are received by the base station 10, it is determined that a packet loss has occurred in a communication path between the base station 10 and the terminal 20. Then, the base station 10 decreases the window size of TCP to perform control so that the data amount transmitted per unit time is decreased, and retransmits a packet. For this reason, in spite of the fact that a packet will be delivered to the terminal 20 if the terminal 20 waits for it, when the number of duplicate ACKs increases because of reversal of the order of packets, the window size is decreased even if a packet loss has not occurred, so that the throughput is decreased. Furthermore, the packet 2(B) that does not have to be retransmitted is retransmitted to a network.

Returning now to FIG. 3, the terminal 20 that has received the packet 2(A) after receipt of the packet 3(B) and the packet 4(B) presents a fifth number as the sequence number of a packet that the terminal 20 has not yet received, in an ACK, and transmits this ACK 5 to the base station 10.

Here, it is assumed that the base station 10 decreases the window size in response to the fact that the base station 10 has received a plurality of duplicate ACKs. For this reason, in the example illustrated in FIG. 3, upon receipt of the ACK 5, the base station 10 decreases the number of packets to be transmitted, and, as a result, the base station 10 transmits only the packet 5(B).

Upon receipt of the packet 5(B), the terminal 20 presents a sixth number as the sequence number of a packet that the terminal 20 has not yet received, in an ACK, and transmits this ACK 6 to the base station 10. Note that the number of packets to be transmitted by the base station 10 gradually increases while the base station 10 verifies that an ACK may be received correctly, and, in the case illustrated in FIG. 3, the base station 10 receives the ACK 6 and thereafter will transmit three packets to the terminal 20.

Upon receipt of the ACK 6, the base station 10 verifies that the packet 5(B) has been received by the terminal 20, and transmits the requested packet 6(A), and the packet 7(B) and the packet 8(B) that may be transmitted within the window size, to the terminal 20. Here, in the example illustrated in FIG. 3, by following rules for wireless link switching in the base station 10, the packet 6(A) is transmitted over the wireless link A, and switching between wireless links is carried out after the transmission of the packet 6(A) and then the packet 7(B) and the packet 8(B) are transmitted over the wireless link B.

In the example illustrated in FIG. 3, the communication speed of the wireless link A is still slower than the communication speed of the wireless link B, and there is a difference in communication speed between the wireless link A and the wireless link B. For this reason, the terminal 20 receives the packet 7(B) and the packet 8(B) before receiving the packet 6(A). Accordingly, the terminal 20 has not yet received the packet 6, and therefore transmits the ACK 6 to the base station 10 twice, as illustrated in FIG. 3, in order to request the base station 10 to transmit the packet 6.

This is because while switching between wireless links is carried out at the wireless layer in accordance with the availability of radio resources, transmission control is performed, separately from the switching between wireless links, so that packets are delivered to the reception apparatus in accordance with the protocol of TCP. In this way, communication control operations are performed at different communication layers independently of each other. Therefore, even if the order of packets is reversed because of the communication speed difference and the communication delay difference between wireless links, and a packet is to be delivered to the reception apparatus if the reception apparatus waits for it, redundant duplicate ACKs occur. Then, the redundant duplicate ACKs use radio resources and control is performed so as to decrease the throughput according to the protocol of TCP, and thus a packet that does not have to be retransmitted is retransmitted. Such a technical problem is a problem newly found by the inventor.

Figure 4:
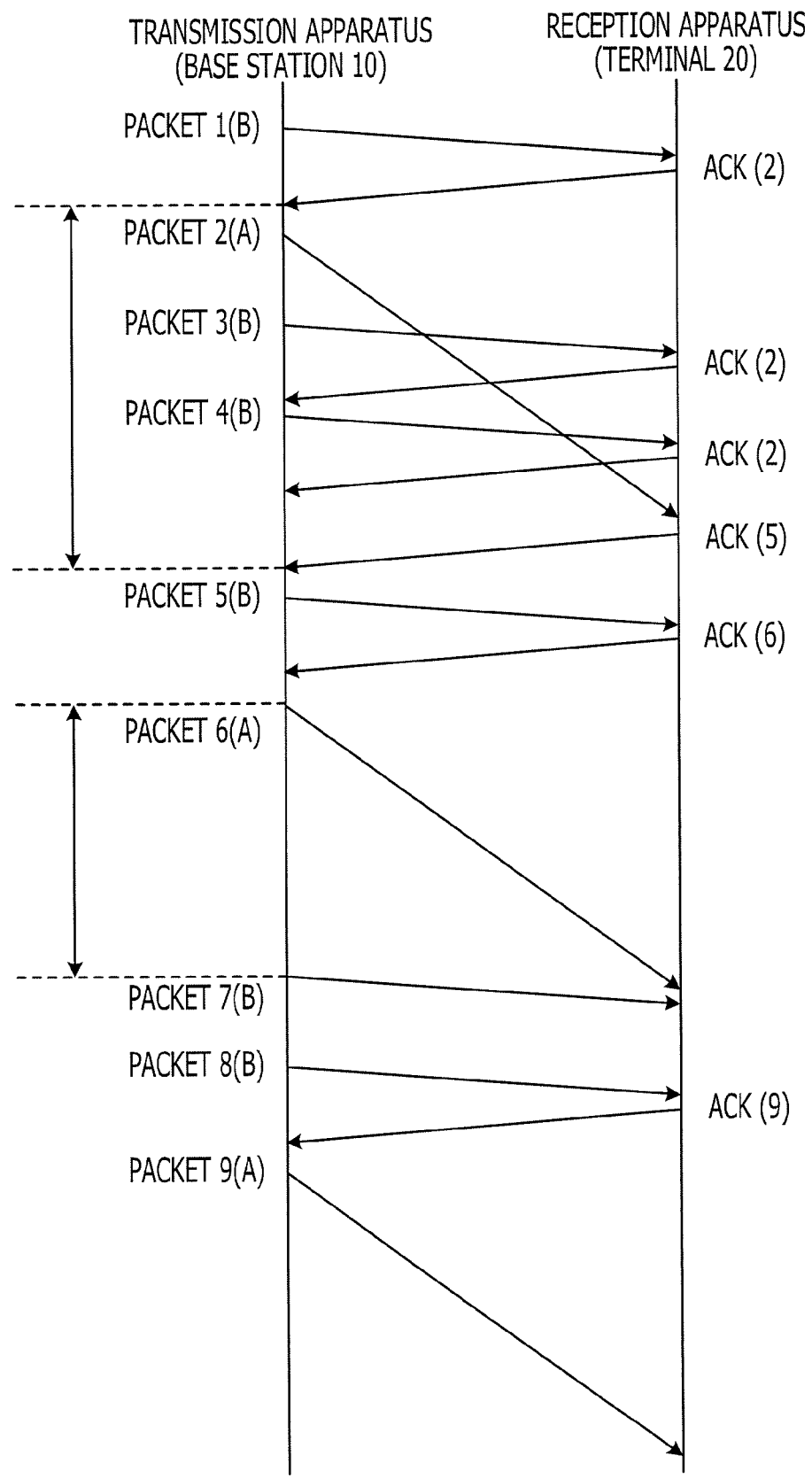
FIG. 4 illustrates another example of communication in the communication system of the embodiment.

FIG. 4 illustrates another example of communication in the communication system of the embodiment. The example illustrated in FIG. 4 is an example in which even if switching communication settings, which may cause reversal of the order of packets for the reasons described with reference to FIG. 3, is carried out, packet transmission is delayed by the base station 10 so that the order of packets will not be reversed, according to the embodiment described later.

First, the packet 1(B) is transmitted from the base station 10 to the terminal 20 using the wireless link B. Upon receipt of the packet 1(B), the terminal 20 presents 2, which is next to 1, as the sequence number of a packet positioned at the beginning of the order of packets that have not arrived at the terminal 20, in an ACK (illustrated as "ACK (2)" in FIG. 4), and transmits this ACK 2 to the base station 10, thereby requesting the base station 10 to transmit the packet 2. Additionally, the terminal 20 notifies the base station 10 of the window size, which is the size of data that may be successively received, by using the ACK 2.

Upon receipt of the ACK 2, the base station 10 transmits the packet 2(A), and the packet 3(B) and the packet 4(B) that may be transmitted within the window size, to the terminal 20. Here, in the example illustrated in FIG. 4, by following rules for wireless link switching in the base station 10, the packet 2(A) is transmitted over the wireless link A different from a wireless link used for the packet 1(B), and switching between wireless links is carried out after the transmission of the packet 2(A) and then the packet 3(B) and the packet 4(B) are transmitted over the wireless link B.

Here, in the example illustrated in FIG. 4, it is assumed that the communication speed of the wireless link A is slower than the communication speed of the wireless link B, and there is a difference in communication speed between the wireless link A and the wireless link B. Note that the example illustrated in FIG. 4 may occur when the communication delay of the wireless link A is larger than that of the wireless link B even if there is no difference in communication speed between the wireless links. Also, even when the wireless links are of the same scheme, there are some cases in which changing the modulation scheme or the coding rate applied to packets leads to a change in the transmission rate of the packets in a manner similar to the case where switching between wireless links is carried out, resulting in reversal of the order of packets. The order of packets may be reversed owing to various reasons such as switching communication settings and the communication delay difference. Here, the case where the order of packets is reversed because of switching between wireless links is described by way of example.

There is a difference in communication speed between the wireless links A and B, and therefore the terminal 20 receives the packet 3(B) and the packet 4(B) before receiving the packet 2(A). Upon receipt of the packet 3(B), since the packet received next to the packet 1(B) by the terminal 20 is the packet 3(B) and the terminal 20 has not yet received the packet 2, the terminal 20 transmits the ACK 2 to the base station 10 again according to the protocol of TCP in order to request the base station 10 to transmit the packet 2. Upon receipt of the packet 4(B), since the terminal 20 has not yet received the packet 2, the terminal 20 transmits the ACK 2 to the base station 10 once more in accordance with the protocol of TCP in order to request the base station 10 to transmit the packet 2.

In this way, in the example illustrated in FIG. 4, the base station 10 receives, in addition to the ACK 2 received before the transmission of the packet 2(A), the ACK 2 indicating the same sequence number as before twice.

The packet 2(A) is transmitted over the wireless link A. Therefore, the terminal 20 receives the packet 2(A) after receipt of the packet 3(B) and the packet 4(B), and then the terminal 20 presents a fifth number as the sequence number of a packet that the terminal 20 has not yet received, in an ACK, and transmits this ACK 5 to the base station 10.

It is assumed that the base station 10 decreases the window size in response to the fact that the base station 10 has received a plurality of duplicate ACKs. For this reason, in the example illustrated in FIG. 4, upon receipt of the ACK 5, the base station 10 decreases the number of packets to be transmitted, and, as a result, the base station 10 transmits only the packet 5(B).

Note that, according to the embodiment, as illustrated in FIG. 8, the time at which the ACK 2 is received first and the time at which the ACK 5 is received are recorded by the base station 10, details of which will be described later. The number of duplicate ACKs received in a time range between the times is also recorded. When switching from a wireless link with a slow communication speed to a wireless link with a fast communication speed is carried out, a transmission of a packet to be transmitted over a wireless link with a faster communication speed is delayed in accordance with time points at which ACKs are received (hereinafter referred to as "reception times" of ACKs) and the number of received ACKs, so that reversal of the order of packets does not occur.

Upon receipt of the packet 5(B), the terminal 20 presents a sixth number as the sequence number of a packet that the terminal 20 has not yet received, in an ACK, and transmits this ACK 6 to the base station 10. Note that the number of packets to be transmitted by the base station 10 gradually increases while the base station 10 verifies that an ACK may be received correctly, and, in the case illustrated in FIG. 4, the base station 10 receives the ACK 6 and thereafter will transmit the packet 6(A), and the packet 7(B) and the packet 8(B) that may be transmitted within the window size, to the terminal 20. Here, in the example illustrated in FIG. 4, by following rules for wireless link switching in the base station 10, the packet 6(A) is transmitted over the wireless link A, and switching between the wireless links is carried out after the transmission of the packet 6(A) and then the packet 7(B) and the packet 8(B) are transmitted over the wireless link B.

In the example illustrated in FIG. 4, although the communication speed of the wireless link A is slower than the communication speed of the wireless link B, and there is a difference in communication speed between the wireless link A and the wireless link B, the transmission of the packet 7(B) is delayed according to the embodiment. Then, the amount of delay given to the packet 7(B) is set in accordance with the reception time of an ACK and so on, and is set such that, even with a difference in communication speed between the wireless links A and B, the packet 7(B) does not arrive at the terminal 20 earlier than the packet 6(A), details of which will be described later.

Accordingly, the terminal 20 will receive the packet 6(A), the packet 7(B), and the packet 8(B) in this order. That is, unlike the example illustrated in FIG. 3, the terminal 20 does not transmit the ACK 6 again. Then, upon receipt of the packet 8(B), the terminal 20 presents a ninth number as the sequence number of a packet that the terminal 20 has not yet received, in an ACK, and transmits this ACK 9 to the base station 10.

One aspect of the advantages according to the embodiment has been described with reference to FIG. 4. According to one aspect of the embodiment, in the case where communication settings set in such a manner that packets are distributed among a plurality of wireless links are switched, upon receipt of a request for a transmission of a packet that has been transmitted, through a duplicate ACK, the base station 10 determines that the delay in a wireless link used when the packet having the sequence number in question has been transmitted is large. That is, it is determined that communication delay in this wireless link is larger than that in the other wireless link.

Then, when switching from the wireless link in question to the other wireless link is carried out and then a packet is transmitted, the transmission of the packet to be transmitted using the other wireless link is delayed on the transmission apparatus side, so that reversal of the order of packets does not occur even when switching between wireless links is carried out. In this way, the difference resulting from communication settings is predicted by utilizing the reception statuses of ACKs exchanged between the transmission apparatus and the reception apparatus during usual communication, and the transmission apparatus adjusts the transmission timing of a packet in response to switching between communication settings, so that reversal of the order of packets does not occur.

This decreases the number of redundant duplicate ACKs from the terminal 20 to the base station 10, thereby inhibiting a decrease in throughput caused by reduction of the window size. In addition, a packet that does not have to be retransmitted is no longer retransmitted.

In the example illustrated in FIG. 4, when switching from packet transfer over a wireless link with a large delay to packet transfer over a wireless link with a small delay is carried out, radio resources are efficiently used not by giving delays to all the packets, but by giving a delay to the first packet, for example.

For example, if the fixed delay difference between wireless links is measured using test signals, and a delay corresponding to the delay difference is given to each of packets to be transmitted over a wireless link with a small delay, measurement using test signals has to be made for all the wireless links each time reversal of the order of packets occurs, and transmission of all the packets is delayed, resulting in a decrease in efficiency of usage of radio resources.

Note that one way of inhibiting reversal of the order of packets is to provide a reception buffer in a reception apparatus device, and then arrange the order of packets before packet processing is handed over to the TCP layer of the reception apparatus device. In this case, in the reception apparatus device, the processing load for arrangement of the order of packets may become higher. For this reason, it is more desirable that control for inhibiting reversal of the order of packets may be made by the transmission apparatus as in the embodiment rather than by the reception apparatus device.

The embodiment is effective, not only for switching between wireless links, but also for the case where switching between modulation schemes and coding rates leads to a change in transmission rate, which leads to reversal of the order of packets. For example, when the base station switches the modulation scheme and the coding rate applied to packet transmission to the modulation scheme and the coding rate at a faster transmission rate, the timing of packet transmission may be delayed in response to the switching, so that packets delivered to the reception apparatus are not arranged in the reverse order.

Figure 5:
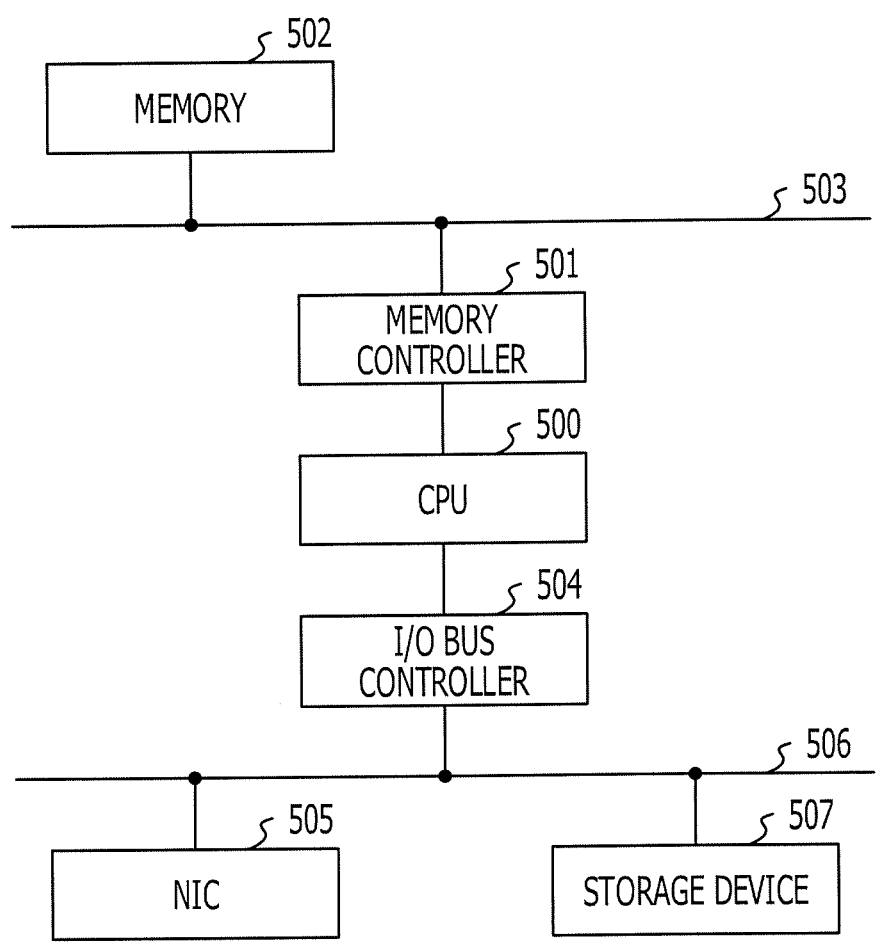
FIG. 5 illustrates an example of a hardware configuration of a communication apparatus of the embodiment.

That is, if there is a possibility that when switching for various communication settings as described above is carried out, switching between communication settings will lead to reversal of the order of packets, the embodiment may quickly handle such a situation by adjusting the transmission timing of a packet in response to the switching between communication settings in accordance with reception statuses of ACKs, so that reversal of the order of packets does not occur. Note that the case where the wireless link, as an exemplary communication setting, is switched will be described, by way of example, in the embodiment described later, and it is to be understood that the embodiment is not limited to this example, as described above. FIG. 5 illustrates an example of a hardware configuration of a communication apparatus of the embodiment. The base station 10 and the terminal 20, which are exemplary communication apparatus, each include a central processing unit (CPU) 500, a memory controller 501, a memory 502, a memory bus 503, an input/output (I/O) bus controller 504, a network interface card (NIC) 505, and an I/O bus 506, and a storage device 507 is connected to the I/O bus 506.

In the memory 502 connected to the memory bus 503, programs for performing various kinds of processing of the base station 10 and the terminal 20 are stored. The CPU 500 reads the programs from the memory 502 through the memory controller 501 and performs various kinds of processing. As various kinds of processing are performed by the CPU 500, writing and reading data from the memory 502 is performed through the memory controller 501. Note that programs executed by the CPU 500 may be stored in the base station 10 and the terminal 20 at the time of shipment, and may also be provided via a recording medium or a network after shipment.

The CPU 500 transfers data to the NIC 505 connected to the I/O bus 506 and receives data and packets from the NIC 505, through the I/O bus controller 504. The CPU 500 reads data from the storage device 507 connected to the I/O bus 506 and writes data to the storage device 507, through the I/O bus controller 504.

The CPU 500 may include one or more CPU cores for performing various kinds of processing. Each CPU core may include one or more processors. The memory 502 is a random access memory (RAM), such as a dynamic RAM (DRAM), for example. The storage device 507 is, for example, a non-volatile memory, such as a read only memory (ROM) or a flash memory, or a magnetic disk drive, such as a hard disk drive (HDD).

Note that the configuration in which the CPU 500, the memory controller 501, the memory 502, the NIC 505, and the storage device 507 are connected to the same bus may be applied to a management server 200. With the hardware configuration illustrated in FIG. 5, functional blocks illustrated in FIG. 6 are implemented and processes illustrated in FIGS. 9 to 15 are performed, thereby enabling communication illustrated in FIG. 2 and FIG. 4 to be realized.

Figure 6:
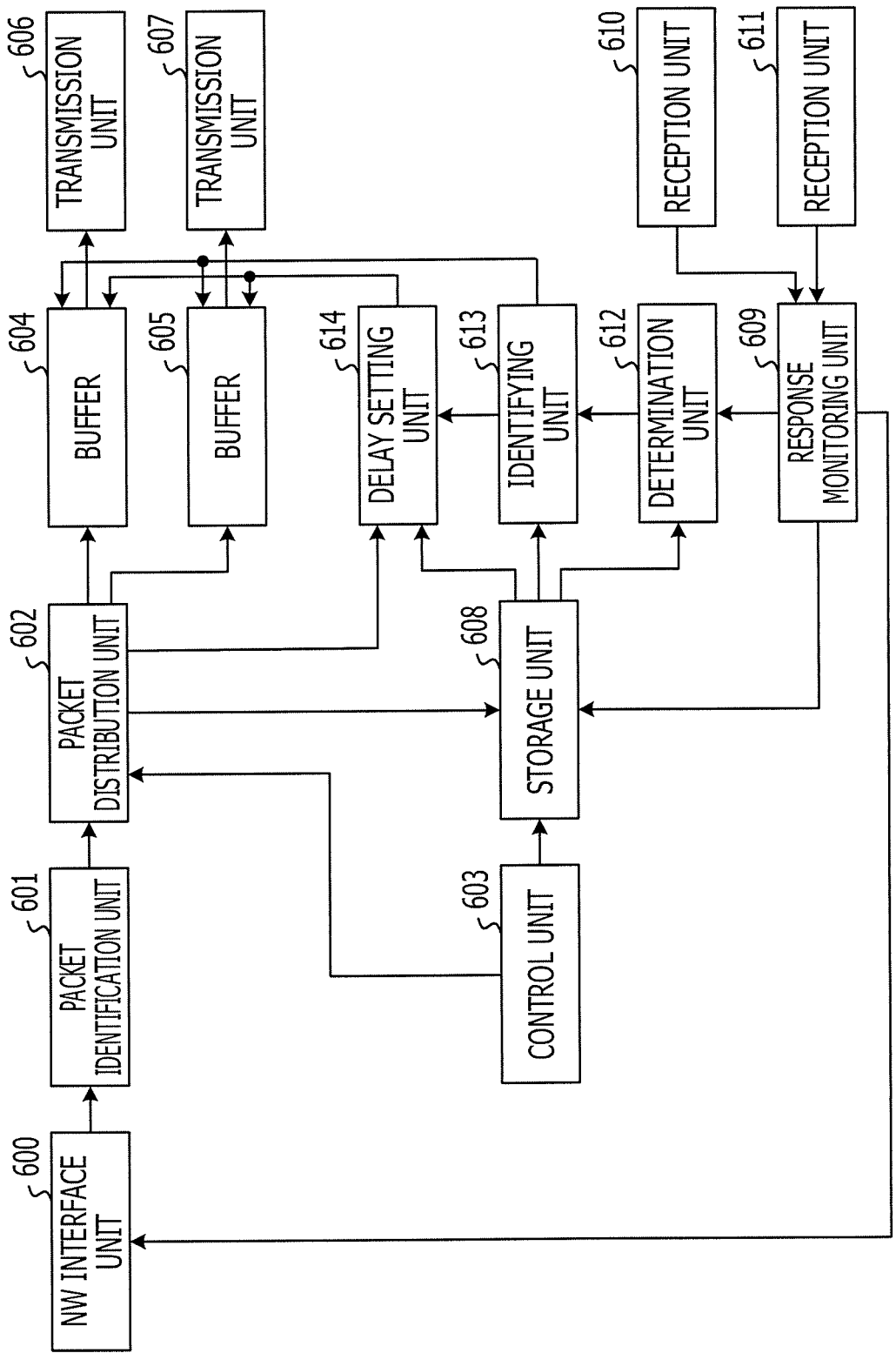
FIG. 6 illustrates an example of functional blocks of a base station of the embodiment.

FIG. 6 illustrates an example of functional blocks of a base station of the embodiment. A program loaded in the memory 502, which is used as a working memory, is executed by the CPU 500, so that the base station 10, which is an exemplary communication apparatus, functions as a network interface unit 600, a packet identification unit 601, a packet distribution unit 602, a control unit 603, a response monitoring unit 609, a determination unit 612, a identifying unit 613, and a delay setting unit 614. Buffers 604 and 605 are implemented by the memory 502 or a First-in First-out (FIFO) memory included in the communication apparatus, and transmission units 606 and 607 as well as reception units 610 and 611 are implemented by the NIC 505. A storage unit 608 is implemented by the memory 502 and the storage device 507.

The network interface unit 600 is coupled to a network for performing communication with the side of the server 40, which is an application server, and receives a TCP packet. The packet identification unit 601 identifies the received TCP packet. By following an instruction of the control unit 603, the packet distribution unit 602 transfers the received packet to the buffer 604 or 605 associated with the corresponding wireless link, which is an exemplary communication setting. The buffer 604 and the transmission unit 606 as well as the buffer 605 and the transmission unit 607 are provided for respective wireless links, each of which is an exemplary communication setting. Then, a packet to be transmitted is transmitted either through the buffer 604 and the transmission unit 606 or through the buffer 605 and the transmission unit 607 to the terminal 20.

The control unit 603 controls operations of the communication apparatus. In the packet distribution unit 602, scheduling of packets is performed, distribution of wireless links is set, and communication settings such as a modulation scheme and coding rate of a wireless link are set. When the packet distribution unit 602 distributes packets of TCP, which are to be handled by link aggregation, among wireless links, information on corresponding relationships between sequence numbers of packets and wireless links selected for transmitting the packets is stored in the storage unit 608. Also, when the modulation scheme and coding rate applied to packets of TCP are changed, information on corresponding relationships between sequence numbers of packets and modulation schemes and coding rates applied to the packets may be stored in the storage unit 608. Also, information on ACKs and duplication ACKs of TCP monitored by the response monitoring unit 609 is stored in the storage unit 608.

The response monitoring unit 609 monitors ACKs and duplicate ACKs of TCP included in packets received through the reception unit 610 or 611 from the terminal 20. In this case, the reception times of ACKs and duplicate ACKs of TCP are monitored, and these reception times are recorded on the storage unit 608.

The determination unit 612 determines reversal of the order of packets, based on information on ACKs and duplicate ACKs of TCP monitored by the response monitoring unit 609.

The identifying unit 613 determines the size relationship between communication speeds resulting from a difference between communication settings (for example, wireless links), based on information on ACKs and duplicate ACKs of TCP and information stored in the storage unit 608.

The delay setting unit 614 is an exemplary adjusting unit that sets a delay in the buffer 604 or 605 corresponding to a communication setting identified by the identifying unit 613 so as to adjust the transmission timing of a packet. Note that if, after a packet is delayed because of a delay set by the delay setting unit 614, another packet is input to the buffer 604 or 605, this input packet is buffered in the buffer 604 or 605 until the delayed packet is transmitted to the transmission unit 606 or 607. That is, overtaking does not occur by setting a delay for a packet in the communication apparatus.

Note that processing performed by functional blocks illustrated in FIG. 6 is described below in such a manner as to correspond to processes illustrated in FIGS. 9 to 15.

FIG. 7 illustrates an example of information stored in the communication apparatus of the embodiment. In FIG. 7, an example of information on the corresponding relationships between the sequence numbers of packets and the communication settings (for example, wireless links) selected for transmitting the packets, which is stored in the storage unit 608, is illustrated, and, for example, it is illustrated that a packet having a first sequence number is transmitted using the wireless link B. The example of the information illustrated in FIG. 7 is updated by the packet distribution unit 602 when packets to be handled by the link aggregation are distributed among wireless links. Note that the information illustrated in FIG. 7 is referred to at the time at which when it is determined that reversal of the order of packets has occurred, the size relationship between communication speeds resulting from a difference between communication settings (for example, wireless links) is determined by the identifying unit 613.

FIG. 8 illustrates another example of information stored in the communication apparatus of the embodiment. In FIG. 8, the example of information on ACKs and duplicate ACKs of TCP stored in the storage unit 608 is illustrated. In FIG. 8, for example, based on the fact that the communication apparatus receives an ACK 2 at a reception time "51: 48.93845" and thereafter receives the ACK 2 twice, the fact that the number of duplication ACKs is two is associated with the other items. Also, the latest reception time "51: 49.00122" and 5, which is the sequence number of an ACK received at that reception time, are associated with each other.

The information illustrated in FIG. 8 is updated by the response monitoring unit 609 when an ACK or duplicate ACK of TCP for a packet to be handled by the link aggregation is received. Note that the information illustrated in FIG. 8 is referred to in the case where the determination unit 612 determines reversal of the order of packets, in the case where the identifying unit 613 determines the size relationship between communication speeds resulting from a difference between communication settings (for example, wireless links), and in the case where the delay setting unit 614 gives a delay to a specific packet.

Figure 9:
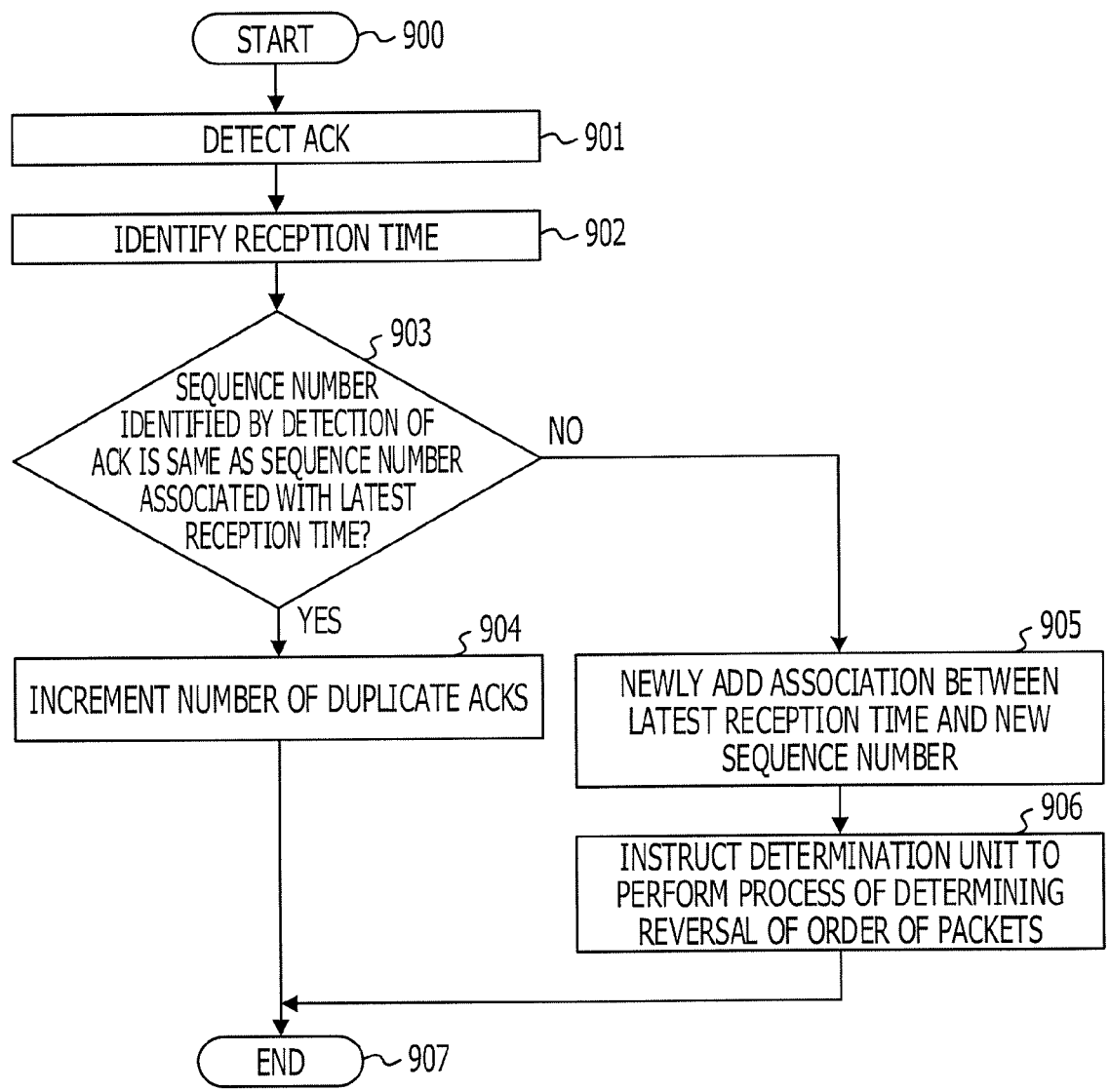
FIG. 9 illustrates an example of a process performed by the communication apparatus of the embodiment.

FIG. 9 illustrates an example of a process performed by the communication apparatus of the embodiment. Operations illustrated in FIG. 9 are an example of a process performed by the response monitoring unit 609 in the communication apparatus. At operation 900, monitoring of an ACK and a duplicate ACK of TCP for a packet to be handled by the link aggregation begins.

When operation 901 for detecting an ACK is performed and an ACK is detected, the sequence number of the ACK is identified. When the sequence number of the ACK has been identified, operation 902 for recording the reception time of the ACK in the memory or the like, as illustrated in FIG. 8, is performed.

Operation 903 for determining whether the identified sequence number is the same as the sequence number associated with the latest reception time in the information illustrated in FIG. 8 is performed. If the sequence numbers are the same, it is determined that the detected ACK is a duplicate ACK, and the process proceeds to operation 904. Otherwise, if not, it is determined that an ACK designated by a new sequence number has been received, and the process proceeds to operation 905.

If, at operation 903, it is determined that the detected ACK is a duplicate ACK, operation 904 for incrementing the number of duplicate ACKs associated with the latest reception time in the information illustrated in FIG. 8 is performed. Upon completion of operation 904, the process proceeds to operation 907.

If, at operation 903, it is determined that the ACK designated by a new sequence number has been received, operation 905 is performed. At operation 905, information in which, assuming that the reception time identified at operation 902 is the latest reception time, the new sequence number is associated with this latest reception time is newly added to the information illustrated in FIG. 8. Note that since the ACK being considered is an ACK designated by the new sequence number, at operation 905, "0", which is the number of duplicate ACKs, is associated with the latest reception time.

Subsequently, at operation 906, the determination unit 612 is instructed to perform a process for determining reversal of the order of packets, and, at operation 907, the process illustrated in FIG. 9 ends.

Figure 10:
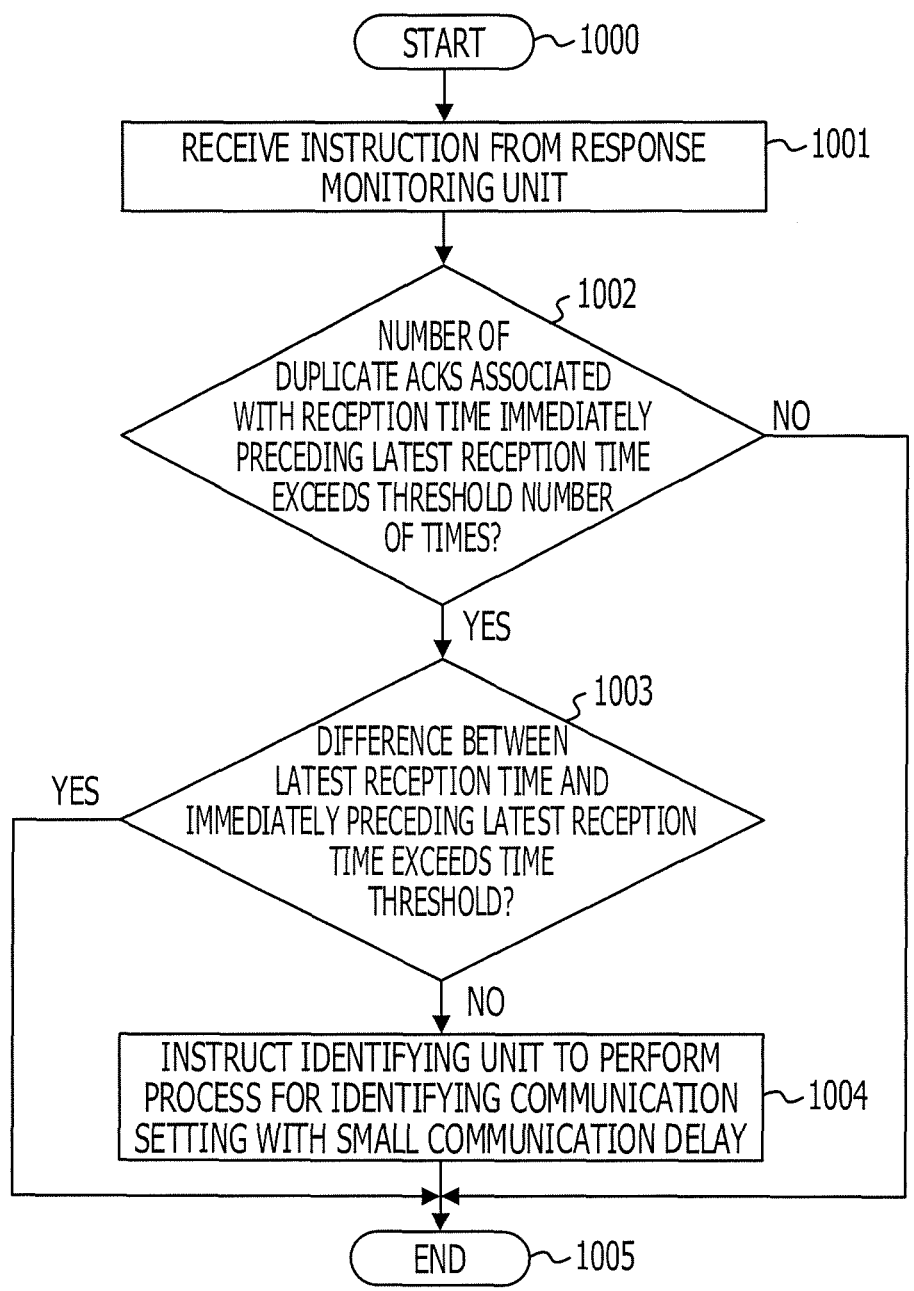
FIG. 10 illustrates another example of the process performed by the communication apparatus of the embodiment.

FIG. 10 illustrates another example of the process performed by the communication apparatus of the embodiment. Operations illustrated in FIG. 10 are an example of a process, which is performed by the determination unit 612 in the communication apparatus, for determining whether reversal of the order of packets has occurred owing to the link aggregation. At operation 1000, the process illustrated in FIG. 10 begins, and, at operation 1001, an instruction issued by the response monitoring unit 609 at operation 906 is received.

Operation 1002 for determining whether the number of duplicate ACKs associated with the reception time immediately preceding the latest reception time exceeds a threshold number of times is performed. At operation 1002, for example, the information illustrated in FIG. 8 is referred to, so that information on ACKs and duplication ACKs of TCP is referred to, and the number of duplicate ACKs associated with the reception time immediately preceding the latest reception time is compared with the threshold number of times. Note that the threshold number of times may be determined, as a criterion for performing packet delay processing described later, in accordance with the extent to which reversal of the order of packets is permitted. For example, if the number of duplicate ACKs is one, reversal of the order packets is to occur once. However, the communication speed difference caused by a difference in communication setting (for example, wireless link) changes moment by moment, and therefore the threshold number of times may be set to be greater than one, for example, in order to wait and see how the communication speed difference will change, without performing packet delay processing even if reversal of the order of packets has occurred once. In this way, the threshold number of times may be set suitably, and, for example, it may be separately set in accordance with the communication status of each base station. Then, if it is determined that the number of duplicate ACKs exceeds the threshold number of times, the process proceeds to operation 1003; if it is determined that the number of duplicate ACKs does not exceed the threshold number of times, the process proceeds to operation 1005.

Operation 1003 for determining whether a difference between the latest reception time and the immediately preceding reception time exceeds a time period threshold is performed. At operation 1003, for example, the information illustrated in FIG. 8 is referred to, so that information on ACKs and duplicate ACKs of TCP is referred to, and a difference between the latest reception time and the immediately preceding reception time is compared with the time period threshold. Note that the time period threshold is a threshold for distinguishing whether the cause of the fact that the number of duplicate ACKs exceeds the threshold number of times lies in reversal of the order of packets or in the fact that a packet does not arrive at the reception apparatus although the reception apparatus have waited for arrival of the packet for a specific time period or the fact that a long time period has elapsed before delivery of a packet to the reception apparatus. That is, the time period threshold is a threshold in terms of time for determining whether a packet already transmitted from the transmission apparatus has not been delivered to the reception apparatus. This time period threshold may be separately set in accordance with the communication status and so on of each base station. If a difference between the latest reception time and the immediately preceding reception time exceeds the time period threshold, it is determined, for example, that a duplicate ACK has occurred because of occurrence of a packet loss in a wireless link between the transmission apparatus and the reception apparatus, and thus packet retransmission control and so on are performed. Then, the process proceeds to operation 1004. Note that it is conceivable that if a difference between the latest reception time and the immediately preceding reception time exceeds the time period threshold, this is a case where a packet transmitted by the server 40 has not arrived at the base station 10. In this case, the base station 10 may request the server 40 to retransmit a packet. For example, based on the reception statuses of duplicate ACKs from the terminal 20, the server 40 determines whether to retransmit a packet. The base station 10 is capable of grasping the status of a packet according to TCP transmitted and received between the server 40 and the terminal 20, and may determine, using the packet status, that retransmission of a packet is desired and request the server 40 to retransmit a packet. The server 40 may be notified of this retransmission request from the base station 10. Also, there are some cases where retransmission control at the wireless layer of the base station 10 has been continuously performed before occurrence of a packet loss, and, as a result, the difference between the latest reception time and the immediately preceding reception time exceeds the time period threshold. These examples are that a packet does not arrive at the reception apparatus and that a long period time is taken until a packet arrives at the reception apparatus. If the transmission timing of a packet is delayed so as to be adaptive to these cases, the delay setting is very different from that used for usual communication status. This degrades communication efficiency. To address this, using the time period threshold, occurrence of reversal of the order of packets is distinguished from occurrence of another event, and a determination is made as to whether to adjust the transmission timing.

Otherwise, if the difference between the latest reception time and the immediately preceding reception time dos not exceed the time period threshold, it is determined that a packet loss has not occurred and reversal of the order of packets has occurred, and then the process proceeds to operation 1004.

Subsequently, at operation 1004, the identifying unit 613 is instructed to perform a process for identifying a communication setting (for example, wireless link) with a small communication delay, and, at operation 1005, the process illustrated in FIG. 10 ends.

Figure 11:
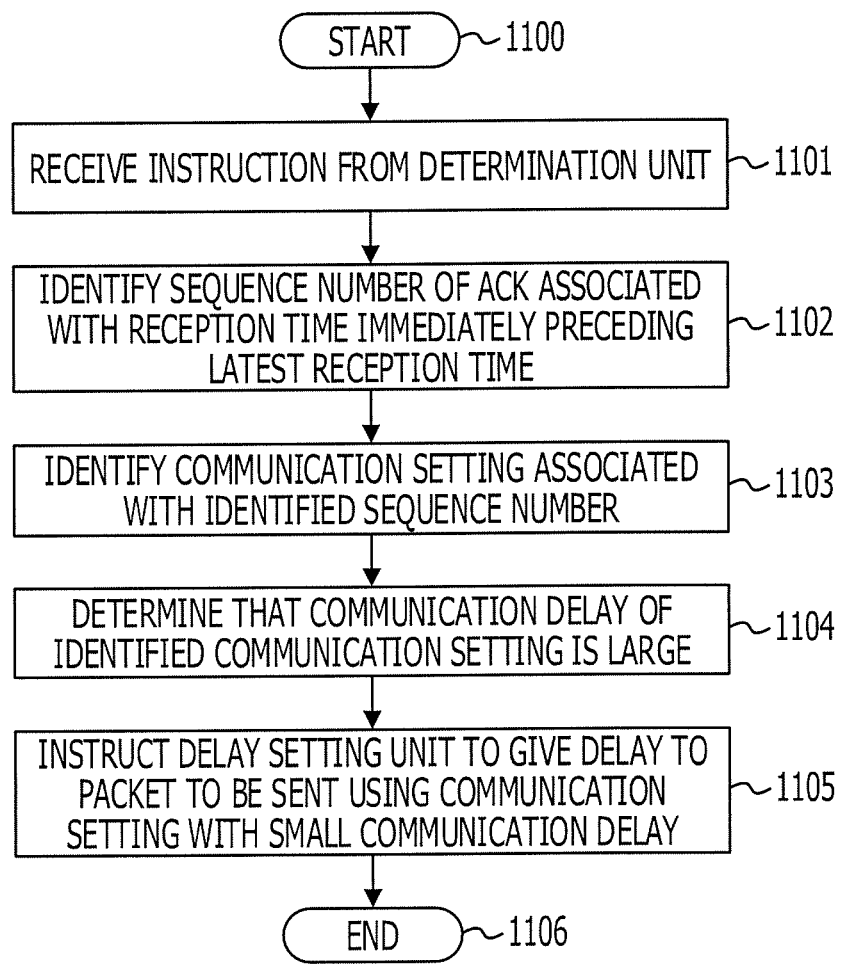
FIG. 11 illustrates another example of the process performed by the communication apparatus of the embodiment.

FIG. 11 illustrates another example of the process performed by the communication apparatus of the embodiment. Operations illustrated in FIG. 11 are an example of a process, which is performed by the identifying unit 613 in the communication apparatus, for identifying a communication setting (for example, wireless link) with a large communication delay by the use of reception statuses of duplicate ACKs, and, with reference to the size relationship between communication settings (for example, wireless links) in terms of communication delay, issuing an instruction for setting a delay for a packet to be transmitted using a communication setting (for example, wireless link) with a small communication delay. At operation 1100, the process illustrated in FIG. 11 begins, and, at operation 1101, an instruction issued by the determination unit 612 at operation 1004 is received.

Operation 1102 for identifying the sequence number of an ACK associated with the reception time immediately preceding the latest reception time is performed. At operation 1102, for example, with reference to the information illustrated in FIG. 8, the sequence number of an ACK associated with the reception time immediately preceding the latest reception time is identified. Note that the identified sequence number indicates that a packet being considered has been largely delayed until delivery to the terminal 20.

Operation 1103 for identifying a communication setting (for example, wireless link) associated with the identified sequence number is performed. At operation 1103, for example, the information illustrated in FIG. 7 is referred to, so that information on the corresponding relationships between the sequence numbers of packets and the communication settings (for example, wireless links) is referred to, and a communication setting (for example, wireless link) associated with the identified sequence number is identified. For example, if the sequence number identified at operation 1102 is "2", with reference to information illustrated in FIG. 7, it is identified that a packet having a sequence number "2" has been transmitted using the wireless link A.

Operation 1104 for determining that the communication delay of the identified communication setting (for example, wireless link) is large is performed. At operation 1104, for example, it is determined that the communication delay in the wireless link A identified at operation 1103 is large. In this determination, it is also determined that the communication delay of the wireless link B is smaller than that of the wireless link A.

Operation 1105 for instructing the delay setting unit 614 to set a delay to a packet to be transmitted using the communication setting (for example, wireless link) with a small communication delay is performed. At operation 1105, the size relationship between communication settings (for example, wireless links) in terms of communication delay is determined based on the operation result at operation 1104, and, for example, the delay setting unit 614 is instructed to set a delay to a packet to be transmitted using the wireless link B. Next to operation 1105, at operation 1106, the process illustrated in FIG. 11 ends.

Figure 12:
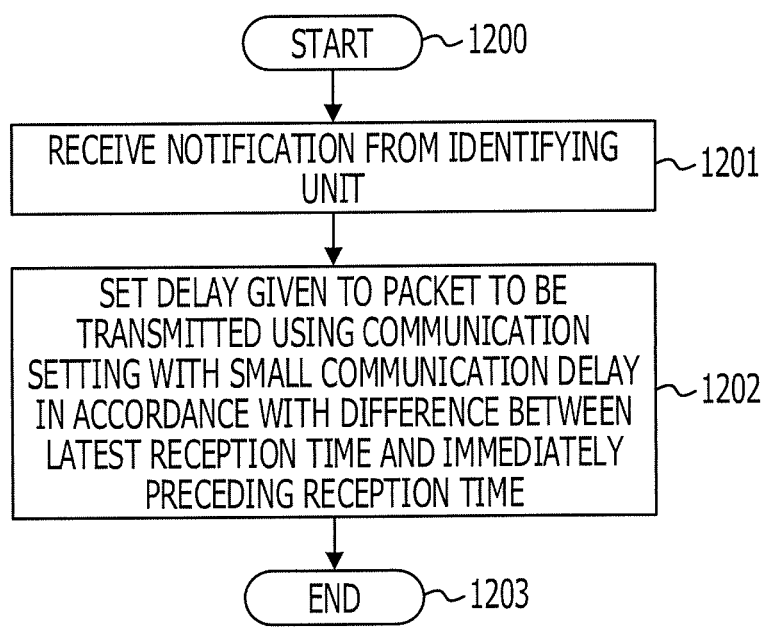
FIG. 12 illustrates another example of the process performed by the communication apparatus of the embodiment.

FIG. 12 illustrates another example of the process performed by the communication apparatus of the embodiment. Operations illustrated in FIG. 12 is an example of a process, which is performed by the delay setting unit 614 in the communication apparatus, for setting a delay to a packet to be transmitted using a communication setting (for example, wireless link) with a small communication delay. At operation 1200, the process illustrated in FIG. 12 begins, and, at operation 1201, an instruction issued by the identifying unit 613 at operation 1105 is received.

Operation 1202 for setting a delay to be given to a packet to be transmitted using a communication setting (for example, wireless link) with a small communication delay, in accordance with a difference between the latest reception time and the immediately preceding reception time is performed. At operation 1202, for example, with reference to the information illustrated in FIG. 8, a delay in accordance with a difference between the latest reception time and the immediately preceding reception time is set for either buffer 604 or 605 associated with the communication setting (for example, wireless link) with a small communication delay.

The difference between the latest reception time and the immediately preceding reception time reflects, for example, a period time taken until a packet is delivered to the terminal 20 when the packet is transmitted using a wireless link with a large communication delay. For this reason, the delay may be set such that even if, in accordance with the difference, the wireless link for transmitting packets is switched from the wireless link with a large communication delay to the communication link with a small communication delay, and then a packet is transmitted, the packet transmitted using the wireless link with a small communication delay will not arrive at the terminal 20 earlier than a packet transmitted using the wireless link with a large communication delay.

In addition, the modulation scheme and the coding rate may also be recorded as communication settings used at the time of packet transmission, and the delay amount set by operation 1202 may be adjusted depending on whether the modulation scheme and the coding rate have been changed. For example, if the modulation scheme and the coding rate applied to a packet for which a duplicate ACK is to be received because of use of the wireless link A differ from the modulation scheme and the coding rate applied to a packet that is thereafter to be transmitted using the wireless link A, the transmission rate will change and the time period taken until delivery to the reception apparatus will change. That is, in the case where the modulation scheme and the coding rate are changed, and, as a result, the transmission rate becomes smaller compared with the case where the modulation scheme and the coding rate are not changed, the delay amount to be set is made larger. This may inhibit the order of packets from being reversed between the current packet and a packet transmitted thereafter over the wireless link B. Also, in the case where even if the modulation scheme and coding rate applied to the wireless link A do not change, for example, the modulation scheme and coding rate applied to the wireless link B are changed to such a modulation scheme and a coding rate that the transmission rate becomes larger, it is desirable that a larger delay amount be set. In this way, according to the embodiment, the delay amount may be adjusted in accordance with a change in transmission rate caused by changing of the modulation scheme and the coding rate.

Note that the delay set by the operation 1202 is set, for example, such that the delay is given to a packet first transmitted after switching from the wireless link with a large communication delay to the wireless link with a small communication delay, which is described later with reference to FIG. 15. Next to operation 1202, at operation 1203, the process illustrated in FIG. 12 ends.

Figure 13:
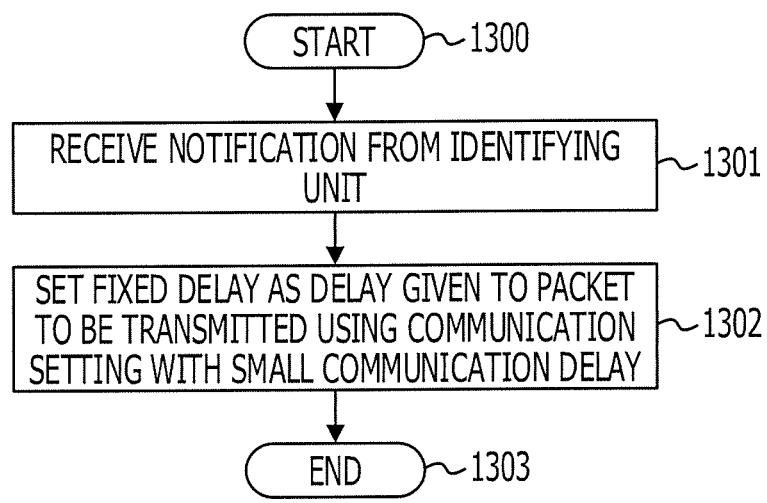
FIG. 13 illustrates another example of the process performed by the communication apparatus of the embodiment.

FIG. 13 illustrates another example of the process performed by the communication apparatus of the embodiment. Operations illustrated in FIG. 13 are another example of the process, which is performed by the delay setting unit 614 in the communication apparatus, for setting a delay to a packet to be transmitted using a communication setting (for example, wireless link) with a small communication delay. At operation 1300, the process illustrated in FIG. 13 begins, and, at operation 1301, an instruction issued by the identifying unit 613 at operation 1105 is received.

Operation 1302 for setting a fixed delay as a delay to be given to a packet to be transmitted using a communication setting (for example, wireless link) with a small communication delay is performed. The fixed delay set at operation 1302 is a delay in such a manner that even if switching from a wireless link with a large communication delay to a wireless link with a small communication delay is carried out and then a packet is transmitted, a packet transmitted using the wireless link with a small communication delay does not arrive at the terminal 20 earlier than the packet transmitted using the wireless link with a large communication delay.

Note that the fixed delay set by operation 1302 is set, for example, so as to be given to a packet transmitted first after switching from the wireless link with a large communication delay to the wireless link with a small communication delay, which is described later with reference to FIG. 15. Next to operation 1302, at operation 1303, the process illustrated in FIG. 13 ends.

Figure 14:
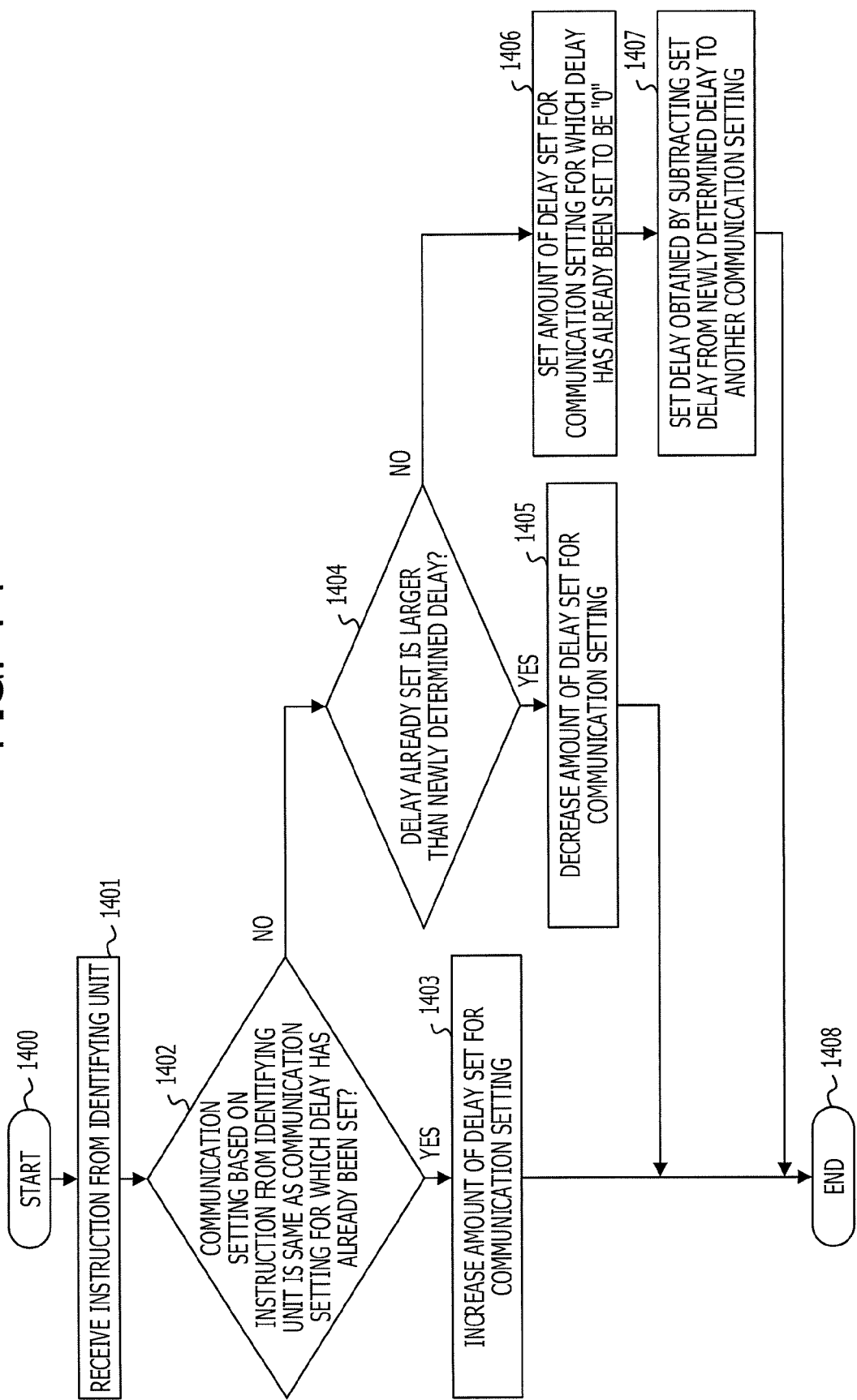
FIG. 14 illustrates another example of the process performed by the communication apparatus of the embodiment.

FIG. 14 illustrates another example of the process performed by the communication apparatus of the embodiment. Operations illustrated in FIG. 14 are an example of a process, which is performed by the delay setting unit 614 in the communication apparatus, for changing a set delay. At operation 1400, the process illustrated in FIG. 12 begins. At operation 1401, an instruction for setting a delay to a packet to be transmitted using a communication setting (for example, wireless link) identified by the identifying unit 613 is received from the identifying unit 613.

Operation 1402 for determining whether the communication setting (for example, wireless link) based on the instruction from the identifying unit 613 is the same as a communication setting (for example, wireless link) for which a delay has already been set is performed. If it is determined that the communication settings are the same, the process proceeds to operation 1403, and operation 1403 is performed in order to increase the amount of delay given to the communication setting (for example, wireless link) for which a delay has already been set. Otherwise, if, as the result of a determination at operation 1402, it is determined that the communication settings are not the same, the process proceeds to operation 1404.

Note that the delay that has been set is regarded as the current delay.

Operation 1404 for determining whether the current delay is larger than a newly determined delay is performed. Here, the newly determined delay is a delay determined by performing the process illustrated in FIG. 12 or FIG. 13 for a communication setting (for example, wireless link) based on the instruction from the identifying unit 613. If it is determined that the current delay is larger than the newly determined delay, operation 1405 is performed in order to decrease the amount of delay given to the communication setting (for example, wireless link) for which a delay has already been set. Otherwise, if, as the result of a determination at operation 1404, it is determined that the current delay is not larger than the newly determined delay, the process proceeds to operation 1406.

Operation 1406 for setting the amount of delay given to the communication setting (for example, wireless link), for which a delay has already been set, to be zero is performed. Subsequently, operation 1407 for setting, to another communication setting (for example, wireless link), a delay obtained by subtracting the current delay from the newly determined delay is performed. Operations 1406 and 1407 do not set the delay given to the communication setting (for example, wireless link), for which a delay has been set, to be below zero but set this delay to be zero, and set the delay given to another communication setting (for example, wireless link) to be a delay obtained by subtracting the current delay from the delay set in the process of FIG. 12 or FIG. 13. At operation 1408, the process illustrated in FIG. 14 ends.

Figure 15:
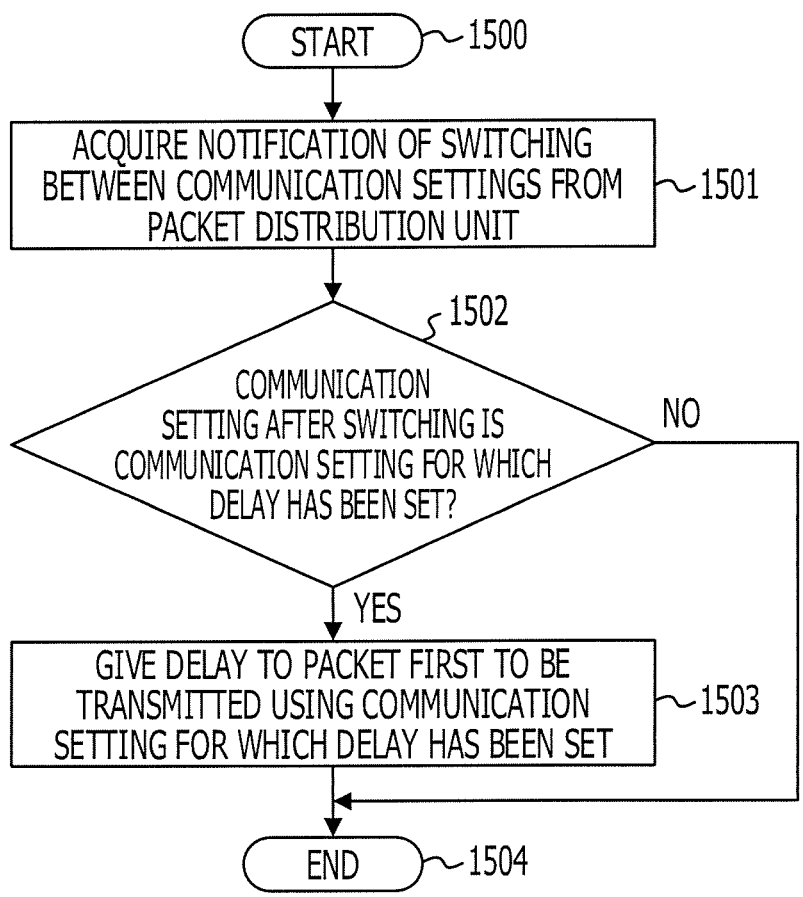
FIG. 15 illustrates another example of the process performed by the communication apparatus of the embodiment.

FIG. 15 illustrates another example of the process performed by the communication apparatus of the embodiment. Operations illustrated in FIG. 15 are an example of a process, which is performed by the delay setting unit 614 in the communication apparatus, for giving a set delay to a packet. At operation 1500, the process illustrated in FIG. 15 begins.

Operation 1501 for acquiring a notification of switching between communication settings (for example, wireless links) from the packet distribution unit 602 is performed. The notification acquired at operation 1501 is a notification acquired when switching between communication settings (for example, wireless links) is carried out by the packet distribution unit 602 owing to the link aggregation.

Operation 1502 for determining whether the communication setting (for example, wireless link) after switching is a communication setting for which a delay has been set is performed. For example, if it is determined that the wireless link after switching is a wireless link for which a delay has been set, the process proceeds to operation 1503, and otherwise proceeds to operation 1504.

Operation 1503 for giving a delay set in the process of FIG. 12 and a delay set or changed in the process of FIG. 14 to a packet to be transmitted first using a communication setting (for example, wireless link) for which a delay has been set is performed. At operation 1503, a delay is set in either the buffer 604 or 605 associated with a communication setting (for example, wireless link) so as to delay the packet to be transmitted first.

Figure 16:
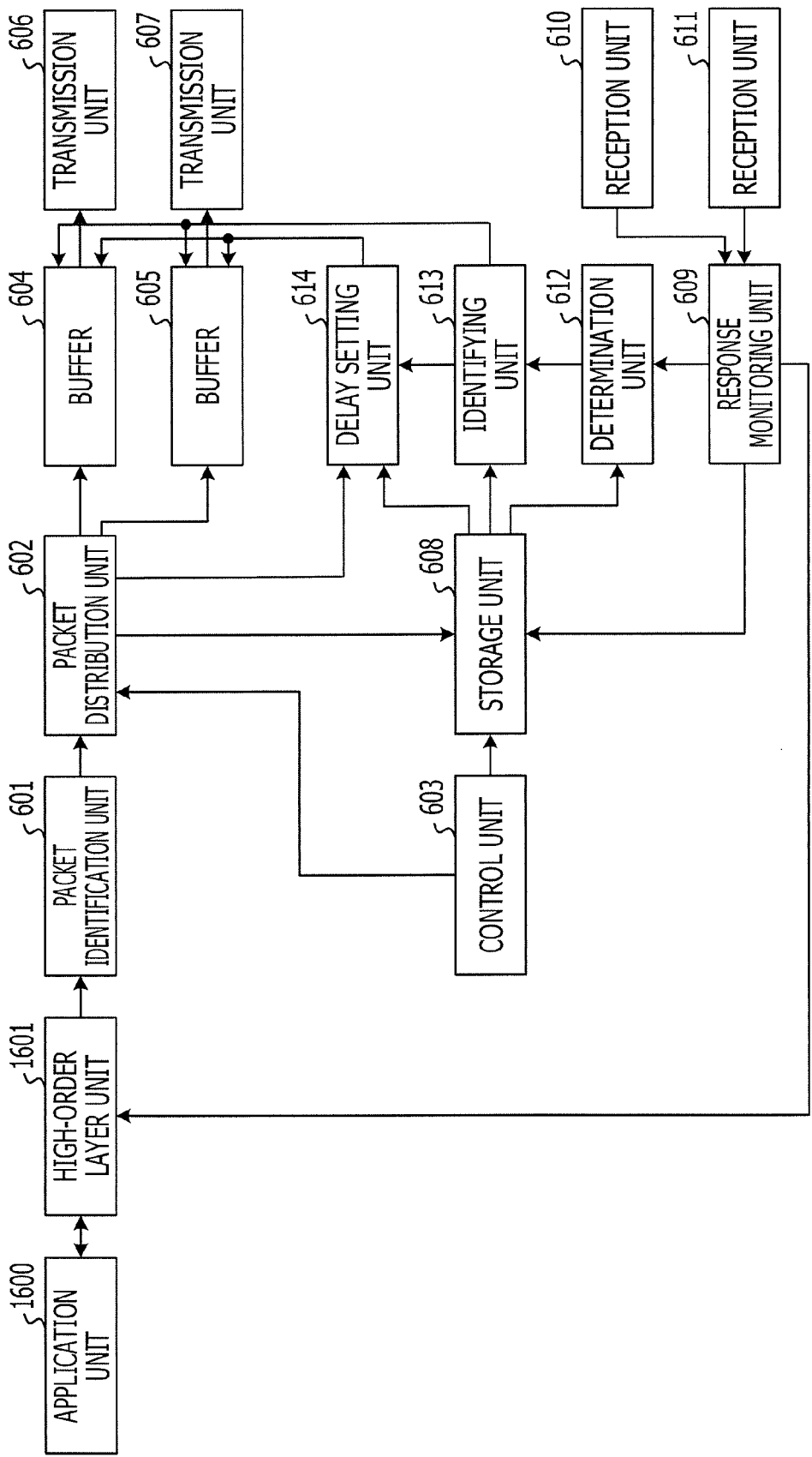
FIG. 16 illustrates an example of functional blocks of a terminal of the embodiment.

FIG. 16 illustrates an example of functional blocks of a terminal of the embodiment. A program loaded in the memory 502, which is used as a working memory, is executed by the CPU 500, so that the terminal 20, which is an exemplary communication apparatus, functions as an application unit 1600, a high-order layer unit 1601, the packet identification unit 601, the packet distribution unit 602, the control unit 603, the response monitoring unit 609, the determination unit 612, the identifying unit 613, and the delay setting unit 614. The buffers 604 and 605 are implemented by the memory 502 or the First-in First-out (FIFO) memory included in the communication apparatus, and the transmission units 606 and 607 as well as the reception units 610 and 611 are implemented by the NIC 505. The storage unit 608 is implemented by the memory 502 and the storage device 507. Note that the same functional blocks as those illustrated in FIG. 6 are denoted by the same reference numerals.

The application unit 1600 transfers application data to the high-order layer unit 1601. The high-order layer unit 1601 converts application data into TCP packets, and transfers them to the packet identification unit 601.

The terminal 20 manages information illustrated in FIGS. 7 and 8 and performs the processes illustrated in FIGS. 9 to 15 by using the functional blocks illustrated in FIG. 16. Thereby, even when switching among a plurality of communication settings is carried out, the terminal 20 predicts reversal of the order of packets using reception statuses of ACKs and adjusts transmission timings as illustrated in FIG. 4, and thereby may inhibit reversal of the order of packets.

According to one aspect of the embodiment described above, for example, a packet transfer device that transfers TCP packets to links using communication settings stores the corresponding relationships between the sequence numbers of packets and the communication settings, at the time of transferring TCP packets to links. The packet transfer device also monitors responses of ACKs and duplicate ACKs of TCP from the reception apparatus that receives TCP packets, and detects reversal of the order of packets due to a difference in communication setting. The packet transfer device also verifies the corresponding relationships between the sequence numbers of packets and the communication settings against reception results of ACKs and duplicate ACKs of TCP, and determines the size relationship between communication delays of packets caused by a difference in communication delay between communication settings. Then, a delay is given to a packet to be transmitted first after switching from a communication setting with a large communication delay to a communication setting with a small communication delay. Thereby, reversal of the order of packets is predicted using reception statuses of ACKs, and transmission timings are adjusted, so that reversal of the order of packets may be inhibited. Accordingly, use of radio resources between the terminal 20 and the base station 10 for redundant duplicate ACKs is reduced, and a decrease in throughput caused by reducing the window size is inhibited.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the presented invention has been described in detail, it should be understood that the various changes, substitutions, and alterations could be made hereto without departing from the spirit and scope of the invention.

What is claimed is:
1. A system for communications, comprising:
a first apparatus including a memory and a processor coupled to the memory, the first apparatus being configured to transmit packets; and
a second apparatus configured to receive the packets transmitted from the first apparatus,
wherein the processor of the first apparatus is configured to:
switch communication settings for transmitting the packets while the packets are transmitted to the second apparatus;
count a number of receptions of a first acknowledgement that is generated by the second apparatus in connection with a first packet transmitted based on a first commu- nication setting among the communication settings from the first apparatus and is transmitted from the second apparatus;

compare the number of receptions of the first acknowledgement with a threshold, upon receiving a second acknowledgement that is generated by the second apparatus in connection with a second packet transmitted based on a second communication setting among the communication settings from the first apparatus and is transmitted from the second apparatus; and adjust, based on the comparison result, a transmission timing of a third packet that is to be transmitted based on the first communication setting.

2. An apparatus for communications, comprising:

a memory; and a processor coupled to the memory and configured to:
switch communication settings for transmission of packets during the packets are transmitted;
count a number of receptions of a first acknowledgment that is generated in connection with a first packet among the packets transmitted based on a first communication setting among the communication settings from the apparatus;
compare the number of receptions of the first acknowledgement with a threshold upon receiving a second acknowledgement that is generated in connection with a second packet among the packets transmitted based on a second communication setting among the communication settings from the apparatus; and
adjust, based on the comparison result, a transmission timing of a third packet that is transmitted based on the first communication setting.

3. The apparatus of claim 2,
wherein a first period for transmitting the first packet based on the first communication setting from the apparatus to a reception apparatus that is configured to receive the packets and transmit an acknowledgement is shorter than a second period for transmitting the second packet based on the second communication setting from the apparatus to the reception apparatus,
wherein the processor of the apparatus is configured to adjust the transmission timing of the third packet when the communication settings are switched from the second communication setting to the first communication setting.

4. The apparatus of claim 3, wherein the second packet is transmitted from the apparatus before a fourth packet is transmitted based on the first communication setting from the apparatus, and the second packet is received by the reception apparatus after the fourth packet is received by the reception apparatus due to a difference between the first period and the second period.

5. The apparatus of claim 4, wherein the second acknowledgement is transmitted by the reception apparatus when the second packet is received by the reception apparatus after the fourth packet is received by the reception apparatus due to the difference between the first period and the second period.

6. The apparatus of claim 5, wherein the processor of the apparatus is configured to determine that the second packet is received by the reception apparatus after the fourth packet is received by the reception apparatus, when the apparatus receives the second acknowledgement.

7. The apparatus of claim 6, wherein the processor of the apparatus is configured to determine that the second packet is received by the reception apparatus after the fourth packet is received by the reception apparatus when the apparatus receives the first acknowledge and the second acknowledge.

8. The apparatus of claim 7, wherein the processor of the apparatus is configured to determine, based on a time difference between reception times of the first acknowledgement and the second acknowledgement, whether the first packet loses.

9. The apparatus of claim 3, wherein the processor of the apparatus is configured to adjust the transmission timing of the third packet by delaying the transmission timing of the third packet based on a difference between the first communication setting and the second communication setting.

10. The apparatus of claim 9, wherein the processor of the apparatus is configured to delay a transmission of an earliest packet based on the difference between the first communication setting and the second communication setting, the earliest packet being among packets to be transmitted based on the first communication setting upon the switching of the communication settings.

11. The apparatus of claim 2, wherein the processor of the apparatus is configured to store a relationship between sequence numbers of the packets and the communication settings applied to each of the packets.

12. The apparatus of claim 2, wherein the communication settings are different from each other in respect with wireless communication scheme.

13. The apparatus of claim 12, wherein the wireless communication scheme includes a communication scheme of mobile communication and a communication scheme of a wireless local area network.

14. The apparatus of claim 2, wherein the communication settings are different from each other in respect with at least one of a modulation scheme and a coding rate applied to the packets.

15. A non-transitory computer-readable medium including a program stored therein, which when executed by a computer, causes the computer to:
switch communication settings for transmitting the packets during the packets are transmitted;
count a number of receptions of a first acknowledgement that is generated in connection with a first packet among the packets transmitted based on a first communication setting among the communication settings from an apparatus;
compare the number of receptions of the first acknowledgement with a threshold, upon receiving a second acknowledgement that is generated in connection with a second packet among the packets transmitted based on a second communication setting among the communication settings from the apparatus; and
adjust, based on the comparison result, a transmission timing of a third packet that is transmitted based on the first a second communication setting.

16. A method for communications, comprising:
switching communication settings for transmitting the packets during the packets are transmitted;
counting a number of receptions of a first acknowledgement that is generated in connection with a first packet among the packets transmitted based on a first communication setting among the communication settings from an apparatus;
comparing the number of receptions of the first acknowledgement with a threshold, upon receiving a second acknowledgement that is generated in connection with a second packet among the packets transmitted based on a second communication setting among the communication settings from the apparatus; and adjusting, based on the comparison result, a transmission timing of a third packet that is transmitted based on the first communication setting.

17. The system of claim 1, wherein the transmission timing of the third packet is adjusted when the communication settings are switched from the second communication setting to the first communication setting.

18. The non-transitory computer-readable medium of claim 15, wherein the transmission timing of the third packet is adjusted when the communication settings are switched from the second communication setting to the first communication setting.

19. The method of claim 16, wherein the transmission timing of the third packet is adjusted when the communication settings are switched from the second communication setting to the first communication setting.

* * * * *